(12) United States Patent
Hardy

(10) Patent No.: US 11,332,294 B1
(45) Date of Patent: May 17, 2022

(54) THRU-HULL ADAPTERS FOR PRESSURE-PROOF HOUSINGS

(71) Applicant: global ocean design llc, San Diego, CA (US)

(72) Inventor: Kevin Richard Hardy, San Diego, CA (US)

(*) Notice: Subject to any disclaimer, the term of this patent is extended or adjusted under 35 U.S.C. 154(b) by 641 days.

(21) Appl. No.: 16/145,297

(22) Filed: Sep. 28, 2018

Related U.S. Application Data

(60) Provisional application No. 62/567,667, filed on Oct. 3, 2017.

(51) Int. Cl.
| | | |
|---|---|---|
| *B65D 81/02* | (2006.01) | |
| *F16L 5/08* | (2006.01) | |
| *H04N 5/225* | (2006.01) | |

(52) U.S. Cl.
CPC ............ *B65D 81/022* (2013.01); *F16L 5/08* (2013.01); *H04N 5/2252* (2013.01)

(58) Field of Classification Search
CPC ....... B65D 81/022; F16L 5/08; H04N 5/2252; F16B 37/125
USPC .......................... 285/205, 206, 207; 411/542
See application file for complete search history.

(56) References Cited

U.S. PATENT DOCUMENTS

| | | | |
|---|---|---|---|
| 3,041,913 A * | 7/1962 | Liska | |
| 3,245,373 A | 4/1966 | Sibold | |
| 3,750,088 A | 7/1973 | Berian | |
| 4,142,770 A | 3/1979 | Butler, Jr. et al. | |
| 4,346,404 A | 8/1982 | Gantenbrink | |
| 4,394,096 A * | 7/1983 | Stevens | |
| 5,439,256 A | 8/1995 | Brainard | |
| 6,038,992 A | 3/2000 | Smith | |
| 6,164,231 A | 12/2000 | Shimmell et al. | |
| 6,412,448 B1 * | 7/2002 | Kingston | |
| 7,373,894 B2 | 3/2008 | Rowley | |
| 7,597,361 B2 * | 10/2009 | Theilen | |
| 9,261,129 B2 | 2/2016 | Herrema | |
| 2009/0050043 A1 | 2/2009 | Alvarez | |
| 2010/0285673 A1 | 11/2010 | Orlando | |
| 2011/0034041 A1 | 2/2011 | Sivik et al. | |

OTHER PUBLICATIONS

Garmin Transducers and Intelliducer Sensors at GPS Central, Canada—Marine GPS Supplies, http://www.gpscentral.ca/accessories/transducersNEW.htm#throughhull, Visited Sep. 28, 2018.

* cited by examiner

*Primary Examiner* — James M Hewitt, II
(74) *Attorney, Agent, or Firm* — Mark Wisnosky

(57) ABSTRACT

Multiple embodiments of thru-hull adapters for underwater pressure-proof housings are described. The adapters are suitable for use with pressure proof housings including spheres, cylinders, flat and domed end caps. The thru-hull adapter is comprised of a pressure-proof circular disk that is sized to fit over a through hole drilled through the outer wall of a pressure-proof housing, a hollow threaded shaft that attaches to the circular disk and extends into the interior of the pressure proof housing, a fastener stack including washers and a jam nut that when tightened pulls the circular disk against the outer wall of the pressure proof housing and, with a bonded or o-ring elastomeric seal, forms an air and water tight seal between the thru-hull adapter and the wall of the pressure proof housing.

3 Claims, 21 Drawing Sheets

THRU-HULL ADAPTERS FOR PRESSURE-PROOF HOUSINGS

CROSS-REFERENCE TO RELATED APPLICATIONS

This application claims priority to U.S. Provisional Application 62/567,667 titled: thru-hull adapters for Spherical Underwater Housings, filed on 3 Oct. 2017, by the same inventor.

STATEMENT REGARDING FEDERALLY SPONSORED RESEARCH OR DEVELOPMENT

Not Applicable.

BACKGROUND OF THE INVENTION

Technical Field

The present invention relates to means to provide an attachment of connectors, pressure fittings and sensors to pressure-proof housing used in deep sea exploration.

Related Background Art

The present invention relates to a means to provide a versatile and secure penetration for hollow spherical or cylindrical pressure-proof housings, made of borosilicate or other glass, plastic, metal, ceramic, or other material and adapting generally available underwater connectors, such as made by SubConn, Teledyne Impulse, SeaCon, Birns, Glenair, and others, as well as generally available pressure fittings, such as the Prevco Pressure Relief Valve. Glass drilling and polishing are established arts in the field of spherical underwater housings. Machining of metal tubes and flat or domed endcaps are established arts for cylindrical underwater housings. The thru-hull adapters described allow use of virtually any manufacturer's underwater connectors and fittings used to bring electrical signals, electrical power, fiberoptic communication, as well as mount sensor heads for measurements, contain a camera viewport for video recording, transfer gas or fluid in either direction, install a pressure relief valve or any other broad purpose as one experienced in the art may deem useful.

Hollow spheres have the greatest volume-to-surface area ratio of any geometric shape. They use the least amount of material per volume contained. Spheres intrinsically balance forces in all axes, making them inherently strong by virtue of equal opposing forces, thereby requiring less material to resist ocean pressures. Further, glass itself is immensely strong in compression. Together, these features make hollow spheres inherently stronger and lighter than any other pressure-resistant housing shape used underwater. In addition, spheres displace far more water than they weigh, making them both a housing and flotation.

Glass spherical housings in particular, such as those made by Nautilus Marine Service (Buxtehude, Germany), Teledyne Benthos (Falmouth, Mass., USA), and others, are made of inherently low cost materials, that are chemically and galvanically inert, and able to pass light and electromagnetic waves with little to no attenuation, including magnets and radio waves. While borosilicate or other glass can be formed, drilled, ground and polished, it cannot be tapped or threaded, preventing the use of many common underwater connectors and pressure fittings. The common means is to use a clamping approach using a long threaded shank to pass through the glass to firmly engage the interior wall with a threaded hex nut and washer stack securing the exterior connector-glass interface. As previously found by the inventor, the ambient exterior pressure induced load must be spread over a larger surface area of glass than is typical of most underwater connectors and fittings, using a thin interface plate with an o-ring 2 or 3 o-ring sizes larger than the standard connector o-ring. Available connectors, such as made by MacCartney-SubConn, with extended threaded shafts and these interface plates are expensive, with very long lead times, and limited options for specifying assorted pin or socket configurations.

Additionally, large borosilicate glass spheres may be polished to near optical perfection for use as camera housings. However, the entire sphere must be polished to avoid stresses due to unsupported lapped surfaces, or dimensional differences that form stress risers when only a small area is polished, or only one hemisphere is polished. Thus, even if the camera position is in a fixed location, the entire sphere must be polished inside and out, a very costly and time-consuming process. This also reduces the strength of the housing, and so the depth it can survive, by the degree the housing material must be removed during the polishing process.

Hollow cylinders are the most common form of underwater housing, many made from extruded materials provided by a number of mills in the U.S. and abroad. Often, aluminum is selected for its strength-to-weight ratio, and, in the case of the aluminum alloy 6061, for its natural corrosion resistance. The use of generally available connectors is limited to epoxy bodies to limit galvanic corrosion driven by dissimilar materials. Metal shell connectors of brass, stainless steel or titanium, will create a galvanic potential with the less noble aluminum, forcing corrosion to occur.

There is a need for a thru-hull adapter fitting that can accept any one of the connectors generally available to the underwater industry, by any manufacturer preferred. There is a need for a thru-hull adapter fitting that can accept an optically clear camera viewport, allowing a camera and controller to be placed inside an unpolished glass, plastic, metal or ceramic sphere.

There is a need for a thru-hull adapter fitting that can accept a sensor head, allowing a data logger to be conveniently placed inside a sphere or cylindrical housing. There is a need for a thru-hull adapter that can electrically isolate a connector made of a more noble metal from a less noble metal housing, while still providing the mechanical strength required for deep ocean excursions.

DISCLOSURE OF THE INVENTION

A thru-hull adapter fitting is described that addresses the deficiencies of the current art systems described above. The invention describes three means to seal the adapter to the exterior of the hollow sphere, flat, or domed endcap: the first with an o-ring against a ground flat, the second using an elastomeric bond that adheres to both the glass and the thru-hull adapter fitting, and the third, fused plastic process. Use of the invention provides end-users the full catalog of bulkhead connectors from their preferred manufacturer. This is helpful if an end-user has existing connectors and cables that he must match in any new development, or if they simply prefer a specific manufacturer. Additionally, one thru-hull adapter is described that allows an end-user to use

MODES FOR CARRYING OUT THE INVENTION

Figure 1:
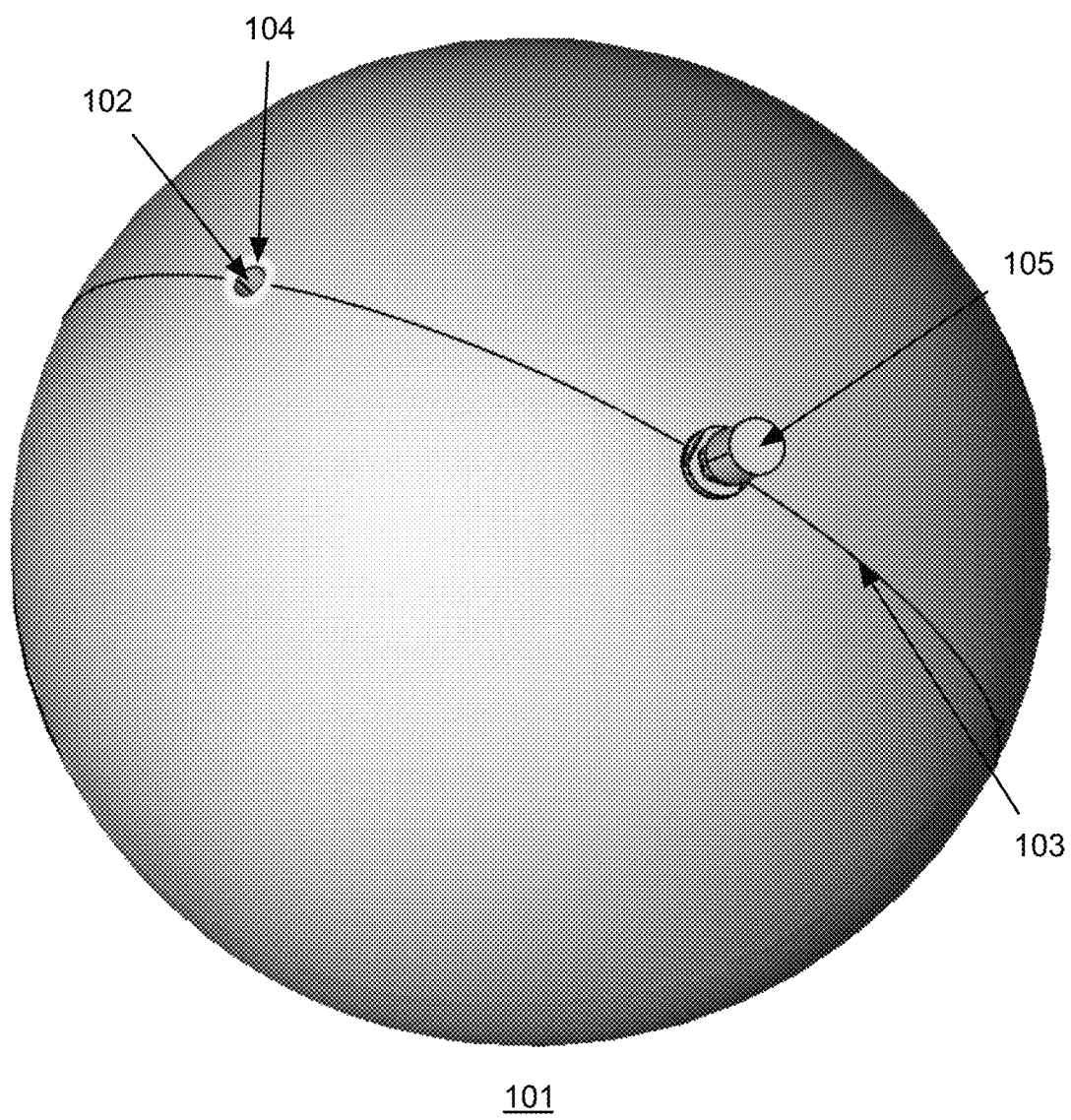
FIG. 1 shows an overview of an example pressure-proof housing using the invented thru-hull adapter.

Referring to FIG. 1, an overview of a thru-hull adapter for a pressure-proof housing is shown. The pressure-proof housing 101 is a hollow sphere or cylinder. The pressure-proof housing has a wall through which connector 105 is attached to provide electrical and mechanical connection from the external environment, typically some depth of the ocean to the interior of the pressure-proof housing. Non-limiting examples of the connector 105 include: an electrical outlet to provide wired connection to interior; a housing for a sensor that is located on the outside of the pressure proof housing and provides electrical connection to electronics on the interior of the pressure proof housing, the electrical connection within the pressure proof housing may be by wired or wireless means; a viewport that allows visual connection between the interior of the pressure proof housing and the external environment used for example in underwater photography or to view activity on the interior of the pressure proof housing; a mechanical connection such as a valve or air connection to the interior of the pressure proof housing that may be used for instance to control the buoyancy of the pressure proof housing or to provide a means for mechanical actuation of the items contained within the pressure proof housing. Commercial examples of pressure proof housings and example connectors are also included in the Related Background Art section of this application. Reference to a "connector 105" in all subsequent discussion is intended to imply any of the potential connectors. A hole 102 is bored through the wall of the pressure housing 101 on a radial line 103 perpendicular to the spherical or cylinder surface, or perpendicular to the face of a flat end cap of a cylindrical housing (not shown). For clarity the hole 102 visible in FIG. 1 contains no connector and adapter and a second hole includes a connector 105. Multiple connectors 105 may be attached to the same pressure-proof housing 101. A ground flat or spotface 104 centered and perpendicular to the radial line 103 is added. The spotface 104 is slightly larger than the o-ring or other means used to seal the connector 105 to the pressure-proof housing 101.

Figure 2:
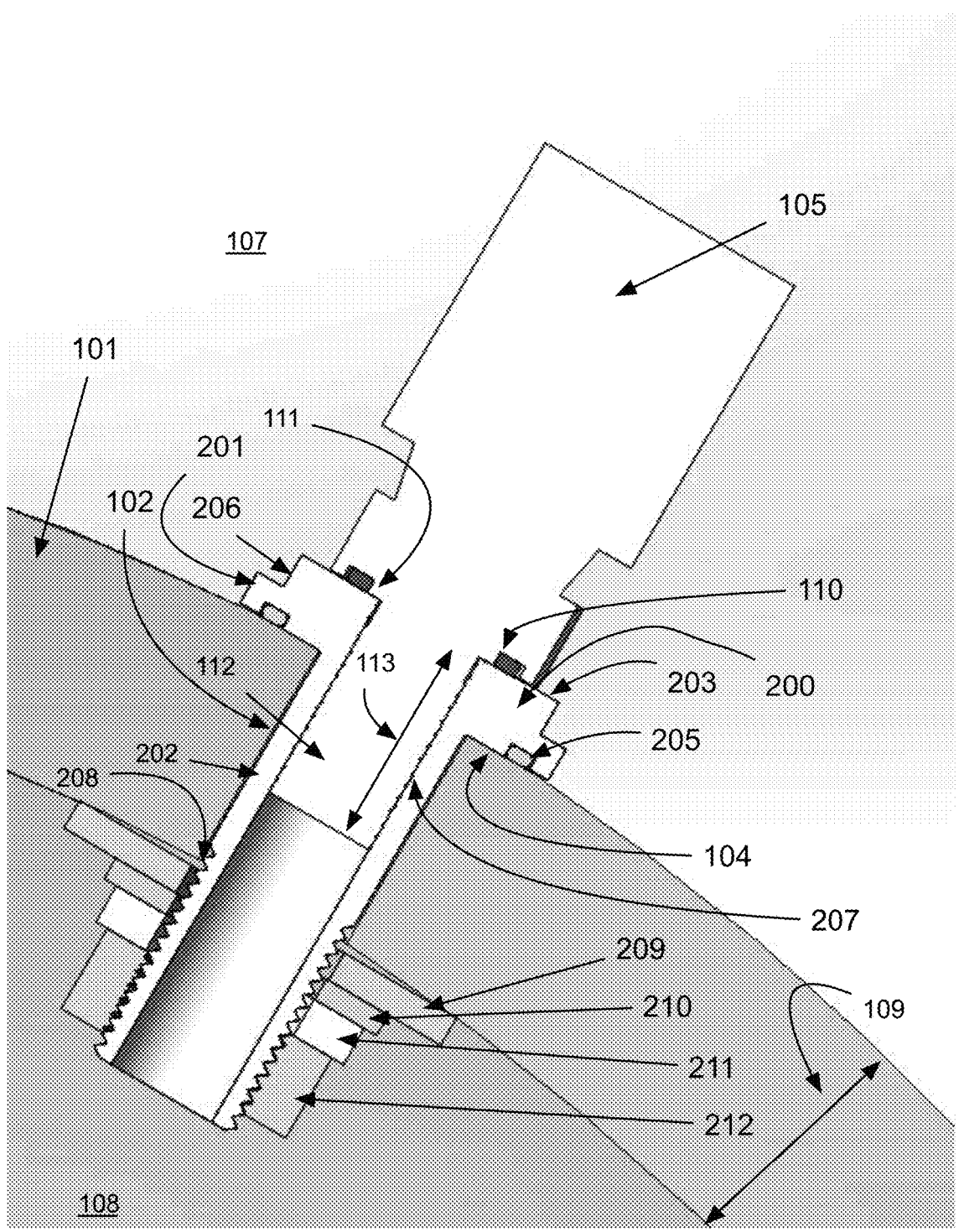
FIG. 2 is a section view of the thru-hull adapter with an o-ring seal, made as one part.
Figure 3:
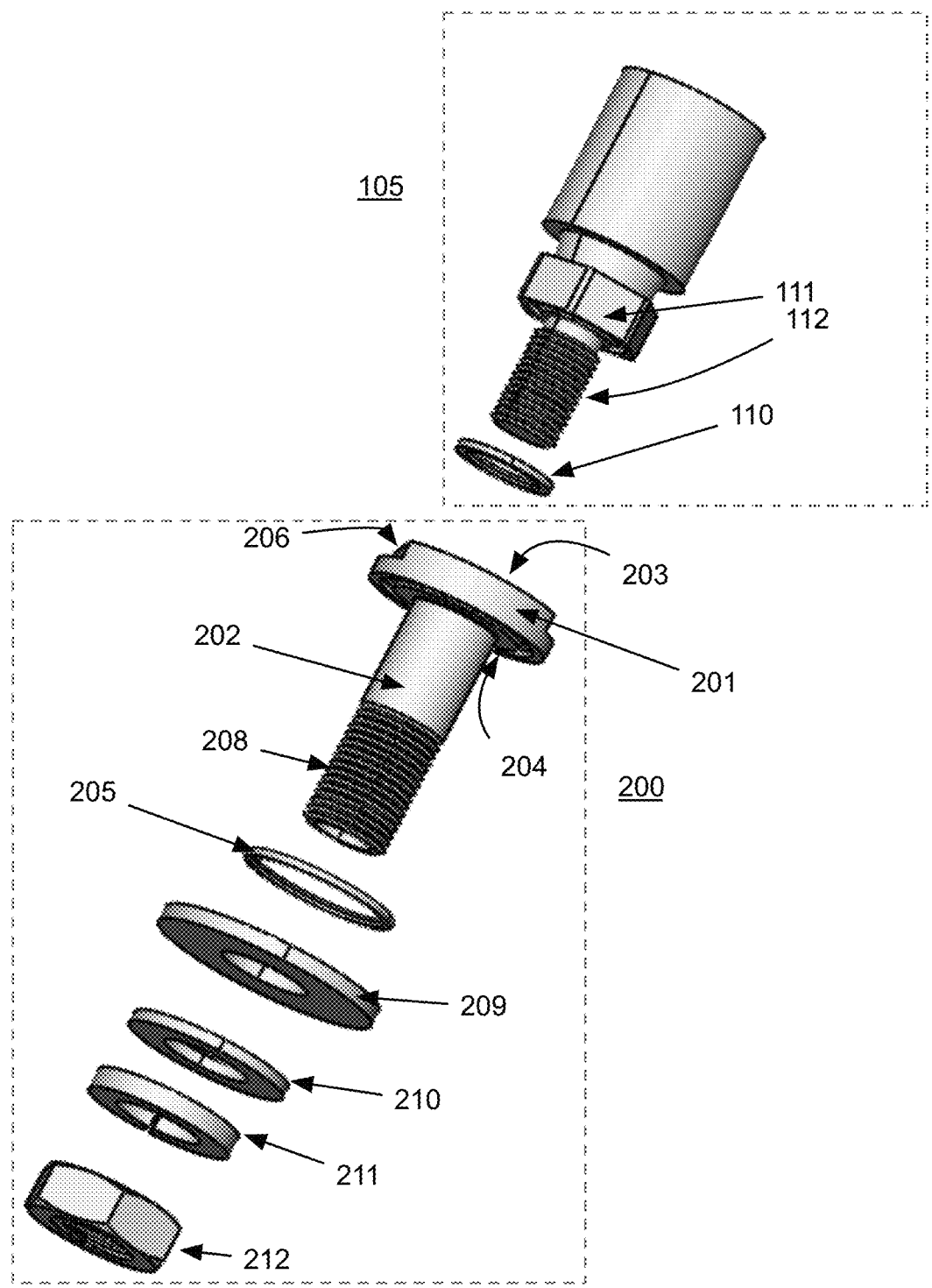
FIG. 3 is an exploded view of the adapter of FIG. 1.

FIG. 2 shows a cross-section view of a first embodiment of the thru-hull adapter. FIG. 3 shows an exploded view of the same embodiment. A pressure proof housing 101, shown in this illustration as a sphere, includes a hole 102 drilled through the wall 109 of the pressure proof housing. The pressure proof housing is as discussed in FIG. 1.

The thru-hull adapter 200 is comprised of a wide circular flat body 201 that engages the surface of a pressure proof housing and a narrow hollow shaft 202 that penetrates the wall of the sphere. In the embodiment shown the wide circular flat 201 and the hollow shaft 202 are formed or bonded into a single unit. The circular flat body 201 includes a top surface 203 and a bottom surface 204. In a preferred embodiment, the top face 203 of the circular flat 201 of the thru-hull adapter 200 is machined to a 32 RMS-circular finish providing a good sealing surface for the chosen connector's o-ring 110, recessed into the bottom flat surface 111 of the connector body. The bottom surface 204 includes a circumferential groove into which o-ring 205 fits. The bottom surface of the circular flat 201 with o-ring 205 are drawn against the spotface 104 by an interior fastener stack described shortly, forming a water-tight seal between the inside 108 and outside 107 of the pressure proof housing 101 with the connector 105 in place.

The hollow threaded cylinder 202 includes an internal thread 207 having a thread size and depth chosen to match the threaded shaft 112 of the connector 105. The hollow threaded cylinder 202 further includes external threads 208 that in conjunction with the fastener stack, comprised of a plastic flat washer 209, steel flat washer 210 of a diameter slightly smaller than the plastic flat washer 209, a lock washer 211, and, a jam hex nut 212, positioned on the interior of the pressure proof housing, secure the thru-hull adapter through the hole 102 in the pressure proof housing.

A connector 105 provides connection between the exterior 107 of the pressure proof housing and the interior 108 of the pressure proof housing 101. The connector is any of the devices as previously described.

The thru-hull adapter 200 is made of material to match the body of the preferred connector 105 to eliminate galvanic corrosion.

Wrench flats 206 are provided to hold the adapter 200 from rotating while the fastener stack is assembled and tightened. Other means to prevent rotation, such as holes to accommodate a spanner wrench, or other means, may be employed.

An additional advantage of this design is the threaded connector post 112 is brought inside the interior volume of the pressure-proof housing, minimizing overall height of the connector and adapter assembly on the exterior of the pressure proof housing.

Figure 4:
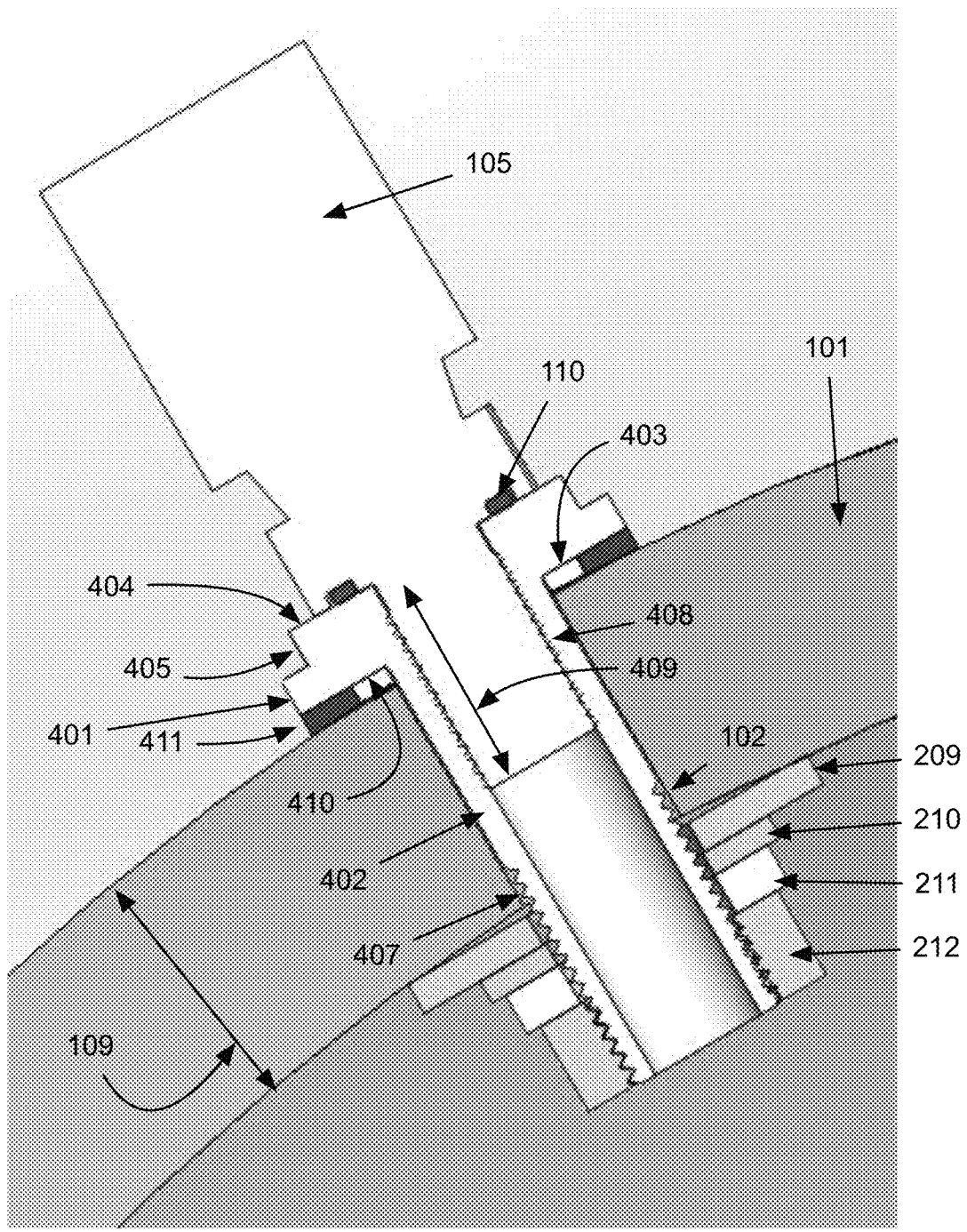
FIG. 4 is a section view of the thru-hull adapter with a bonded seal, made as one part.
Figure 5:
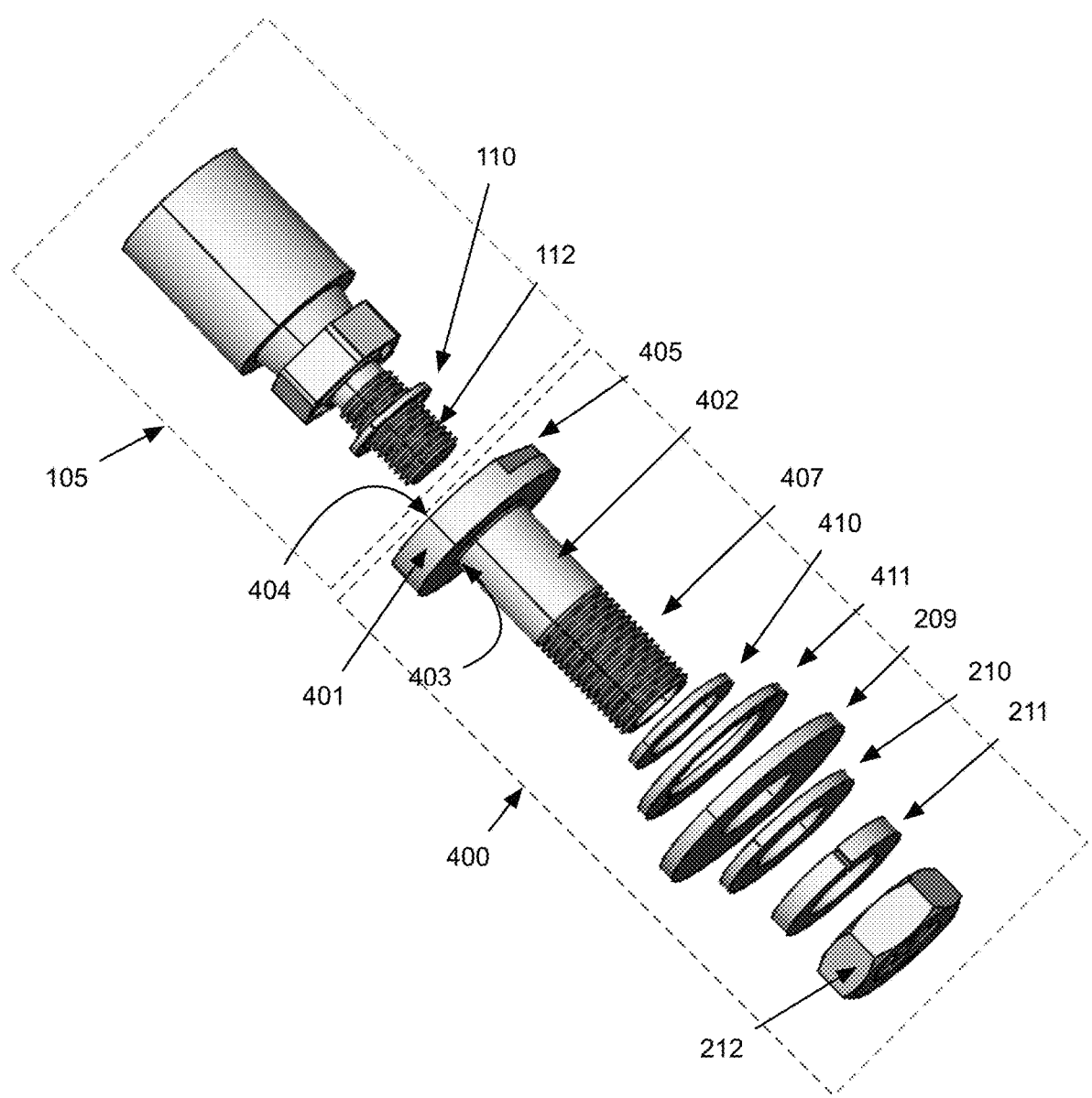
FIG. 5 is an exploded view of the thru-hull adapter of FIG. 4.

Now referring to FIGS. 4 and 5, a second embodiment 400 of the thru-hull adapter is shown. The pressure-proof housing 101 is drilled with through hole 102 on a radial line. The thru-hull adapter 400 includes a circular flat body 401 and a hollow threaded shaft 402. In this embodiment the circular flat 401 and the hollow threaded cylinder 402 are machined as a single unit or are otherwise bonded together to form a single unit. The circular flat 401 includes a top surface 404, against which the connector 105 o-ring 110 is sealed by screwing the connector threaded shaft 112 into the interior threads 408 located in the hollow threaded shaft 402. In a preferred embodiment the top surface 404 is machined to a 32 RMS-circular finish providing a good sealing surface for the chosen connector's o-ring 110. A bottom surface 403 of the circular flat body 401 is sealed against the outer surface of the pressure-proof housing 101 using elastomer 411 supported by plastic spacer 410 to prevent point loading of the housing at the edge of the drilled hole. In one embodiment the spacer 410 is made from an engineering plastic such as PEEK or Acetal, or other appropriate plastic. Marine grade elastomer 411 is applied to the surface of the pressure proof housing, the underside 403 of the circular flat body 401, and coating the plastic spacer 410. In one embodiment the elastomer 411 is 3M 5200, or other appropriate marine-grade or waterproof construction adhesive. Preparation and cleaning of the surfaces to be bonded must be done carefully and thoroughly. One or two part primer of the surfaces may be appropriate.

The size of the through hole 102 drilled through the wall 109 of the pressure proof housing is chosen to accommodate the outside diameter of the hollow threaded shaft 402. The thru-hull adapter 400 is drawn down, engaging the plastic spacer 410 by the interior fastener stack 209-212 comprised of a plastic flat washer 209, steel flat washer 210 of an outside diameter slightly smaller than the plastic flat washer 209, a lock washer 211, and a thin jam hex nut 212 screwed onto the outer threads 407 of the hollow threaded cylinder 402. Flats 405 are provided on the vertical sides of the circular flat 401 to hold the thru-hull adapter fitting 400 from turning while the fastener stack 209-212 is assembled and tightened. Other means to prevent rotation, such as holes to accommodate a spanner wrench, or other means, may be employed. Excess elastomer 411 will squeeze out as the fastener stack is tightened, assuring a full fill by purging any entrained air and filling any voids. Clean-up of excess elastomer is according to manufacturer directions. The thru-hull adapter 400 may be scaled to fit any size threaded shaft 112 of a preferred connector 105.

The thru-hull adapter 400 is made of material to match the body of the preferred connector to eliminate galvanic corrosion. Advantages of this second embodiment are that no spotface is required and no groove to accommodate an o-ring between the thru-hull adapter body and the surface of the pressure-proof housing is required. Elimination of the spot-face preserves the full thickness of the pressure proof housing, reducing potential stress cracking, and maintaining the full depth rating. This simplifies production, reduces the possibility of unintended in-house damage by eliminating steps, and reduces cost by reducing labor time and any required fixturing.

In operation, increasing external ambient pressure with increasing depth presses the thru-hull adapter fitting 400 with an installed connector harder against the plastic spacer 410 and compresses the elastomeric seal 411. The bottom surface 403 of the circular flat 401 is flat. The outer surface of the optimal pressure proof housing for this adapter design is spherical. In geometric terms we have a plane tangent to a sphere at a point. As we move from the center of the circular flat body 401 towards the outer edge the distance between the bottom surface 403 of the thru-hull adapter and the surface of the curved wall of the pressure proof housing 101 increases, forming a circular wedge shape elastomeric seal 411. Increasing ambient pressure forces this elastomeric wedge into the narrowing gap towards the center, following general principles of good seal design. This is better achieved with attachment to a spherical surface than a cylinder or flat endcap.

Figure 6:
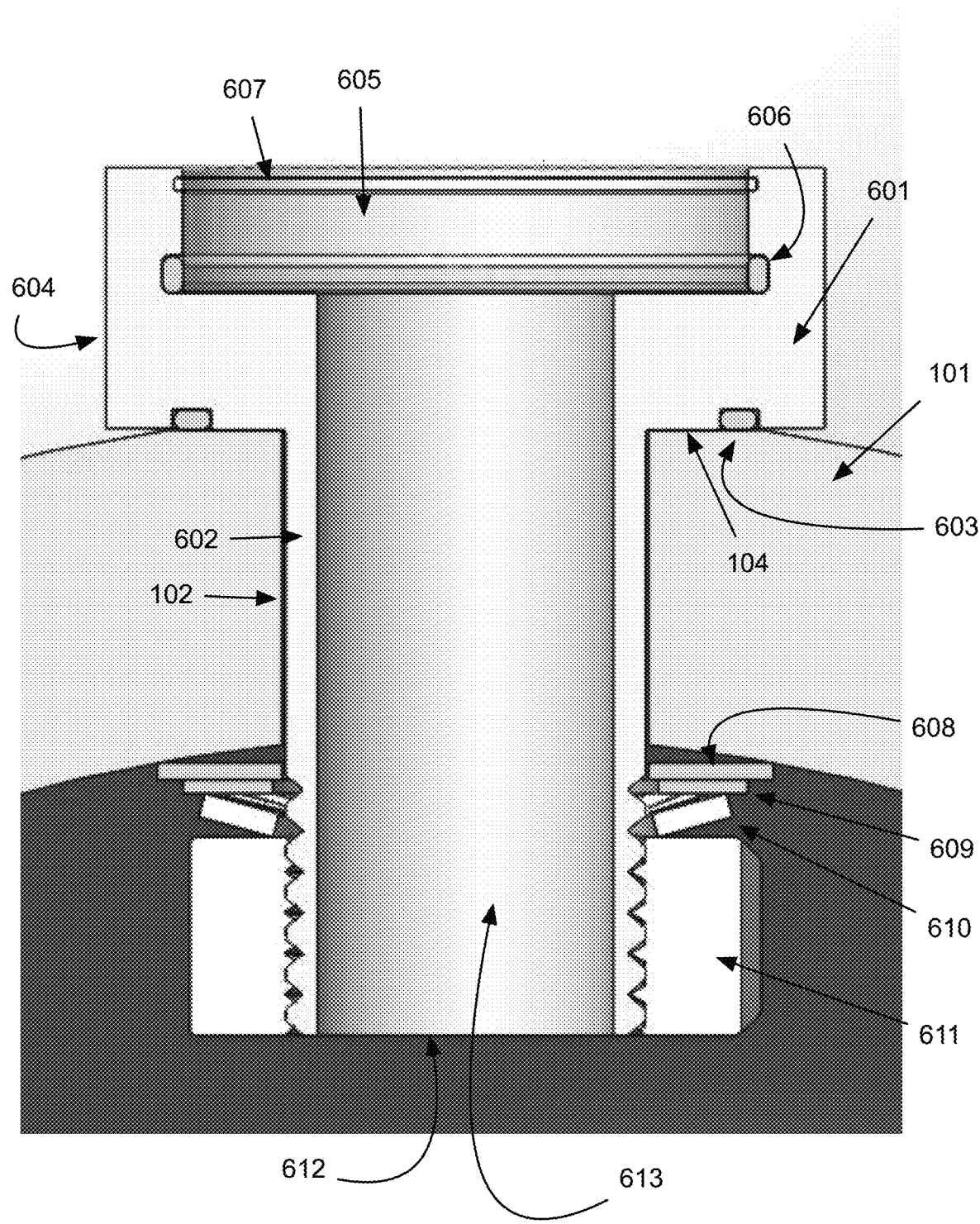
FIG. 6 is a section view of the thru-hull adapter with a camera viewport with an o-ring seal.
Figure 7:
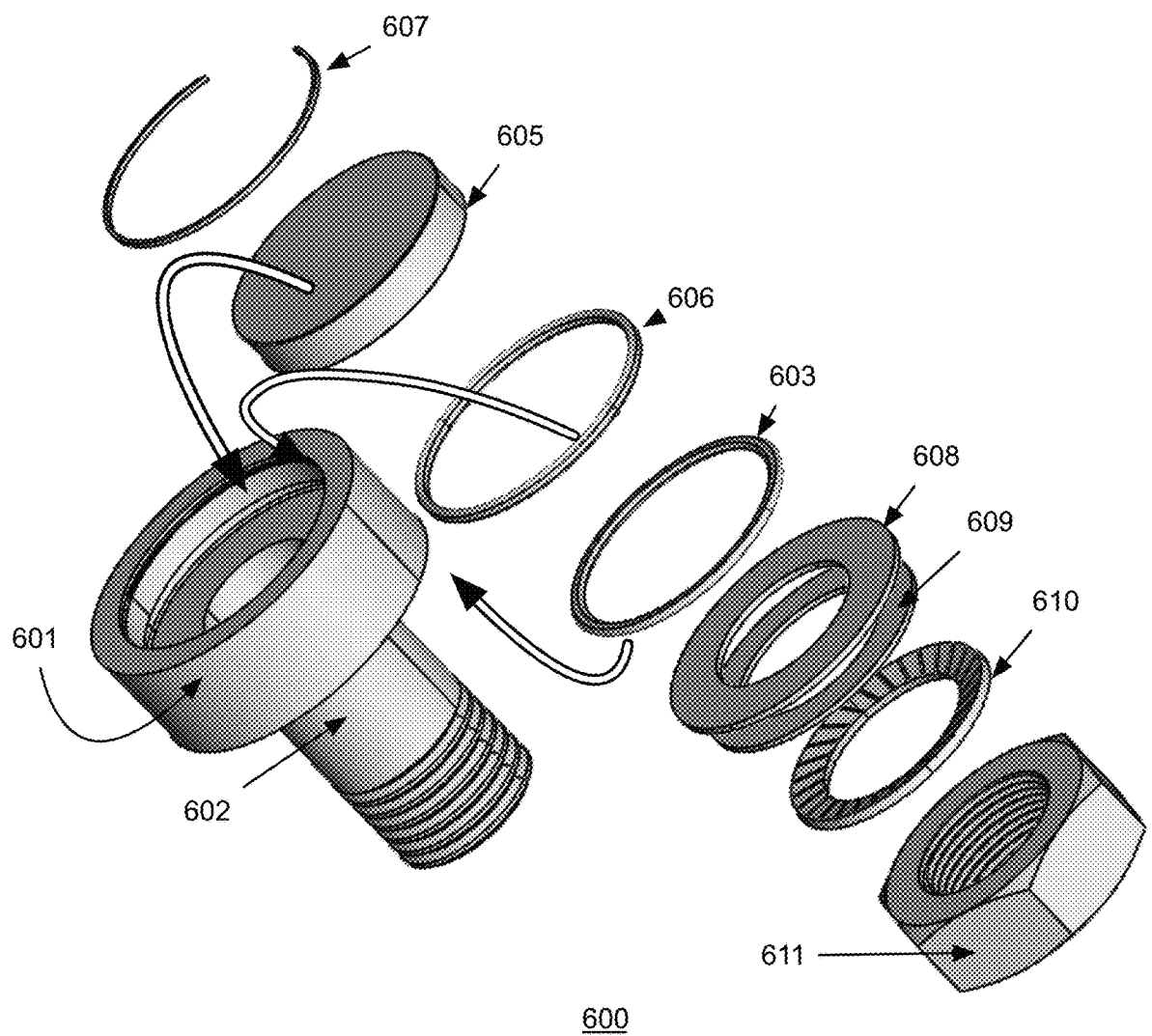
FIG. 7 is an exploded view of the thru-hull adapter of FIG. 6.

Turning now to FIGS. 6 and 7, a thru-hull adapter 600 with a camera view port is shown. A pressure-proof housing 101 has a spotface 104. A hole 102 is drilled through the wall of the pressure proof housing centered on the spotface 104, as already described. The thru-hull adapter 600 is comprised of a circular flat body 601 and a hollow threaded shaft 602. In one embodiment, the thru-hull adapter 600 is made of an appropriately strong material such as Titanium or Titanium alloy, 316SS, or other appropriate material. The thru-hull adapter 600 is sealed to the spotface 104 by o-ring 603 pressed against the spot face 104 upon tightening of the nut 611 of the fastener stack pressing against the interior surface of the pressure—proof housing 101. The fastener stack is comprised of a plastic flat washer 608, steel flat washer 609 of a diameter slightly smaller than the plastic flat washer 608, a lock washer 610, and the thin jam hex nut 611. Wrench flats (not shown) maybe provided on vertical sides 604 of the circular flat 601 to hold the body from turning while the fastener stack is assembled and tightened. Other means to prevent rotation, such as holes to accommodate a spanner wrench, may be employed.

The viewport 605 fits within the circular flat body 601. In a preferred embodiment, the viewport 605 is made of synthetically grown sapphire, or other appropriate optically clear material, such as acrylic. O-ring 606 seals the gap between the outer diameter of the viewport 605 and the inner surface of the circular flat body 601 of the thru-hull adapter 600. A face seal o-ring (not shown) may alternately or jointly be employed. A retaining ring 607 holds the viewport 605 in place. Alternate means to retain the viewport may be employed, such as a screwed or bolted retaining collar. The retaining ring 607, or alternate means such as a screwed or bolted retainer collar, are made of a material galvanically compatible with the thru-hull adapter 600. A camera module, not shown, may be placed within the confines of the open center 613 of the hollow threaded shaft 602.

The thru-hull adapter body 600, shown in the illustration as a single part, may be made of two pieces and fused by some means including, but not limited to, brazing or soldering. In another embodiment the thru-hull adapter is made of two parts. The circular flat body 601 that is exposed to seawater is made of a corrosion resistant and suitably strong material and the hollow threaded shaft 602, is made of some convenient material such as 303 SS. In another embodiment (not shown) the threaded rod may extend beyond the retaining nut 611 at the bottom end 612 of the hollow threaded shaft 602 and further includes a camera mount (not shown).

Figure 8:
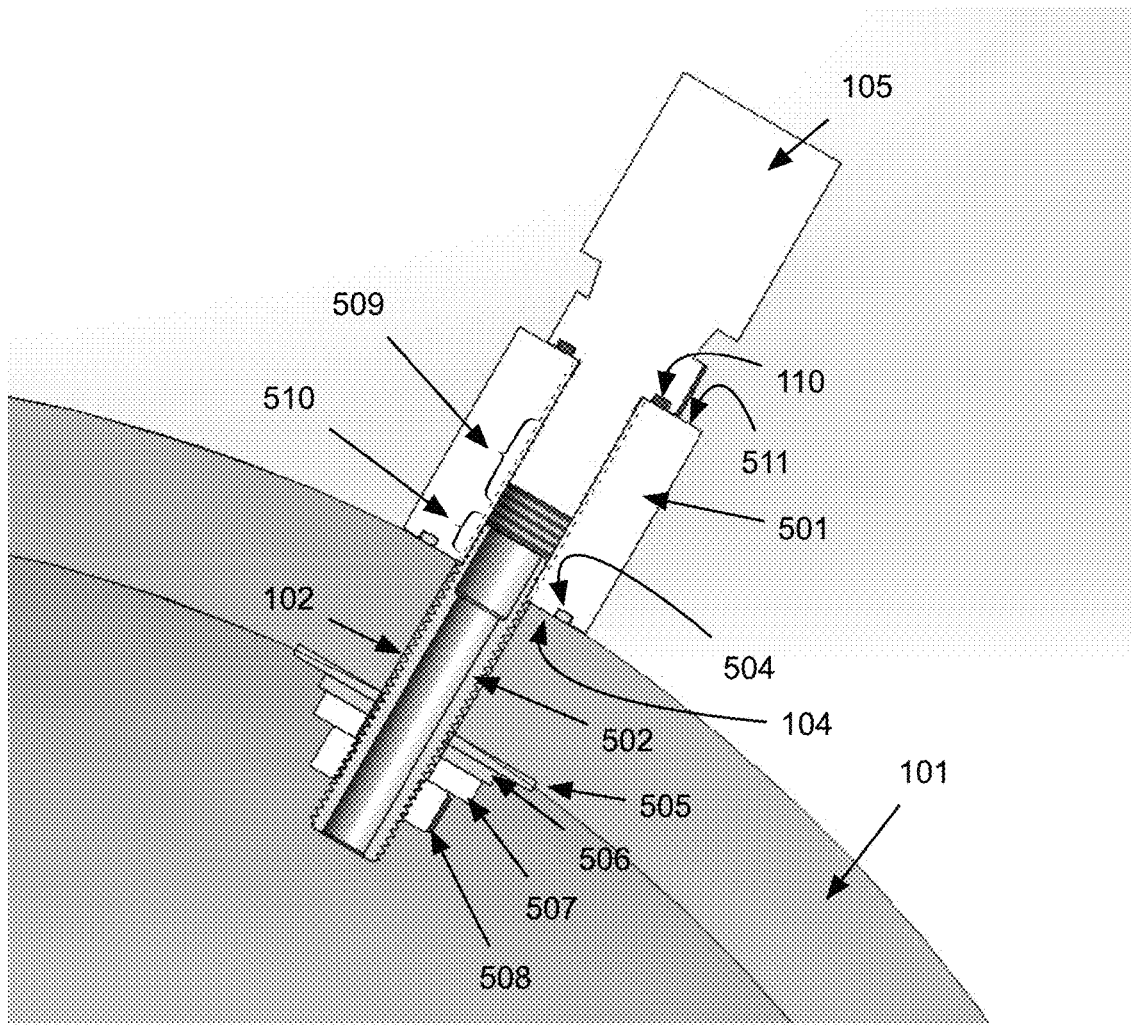
FIG. 8 is a section view of a thru-hull adapter using a pre-existing through hole.
Figure 9:
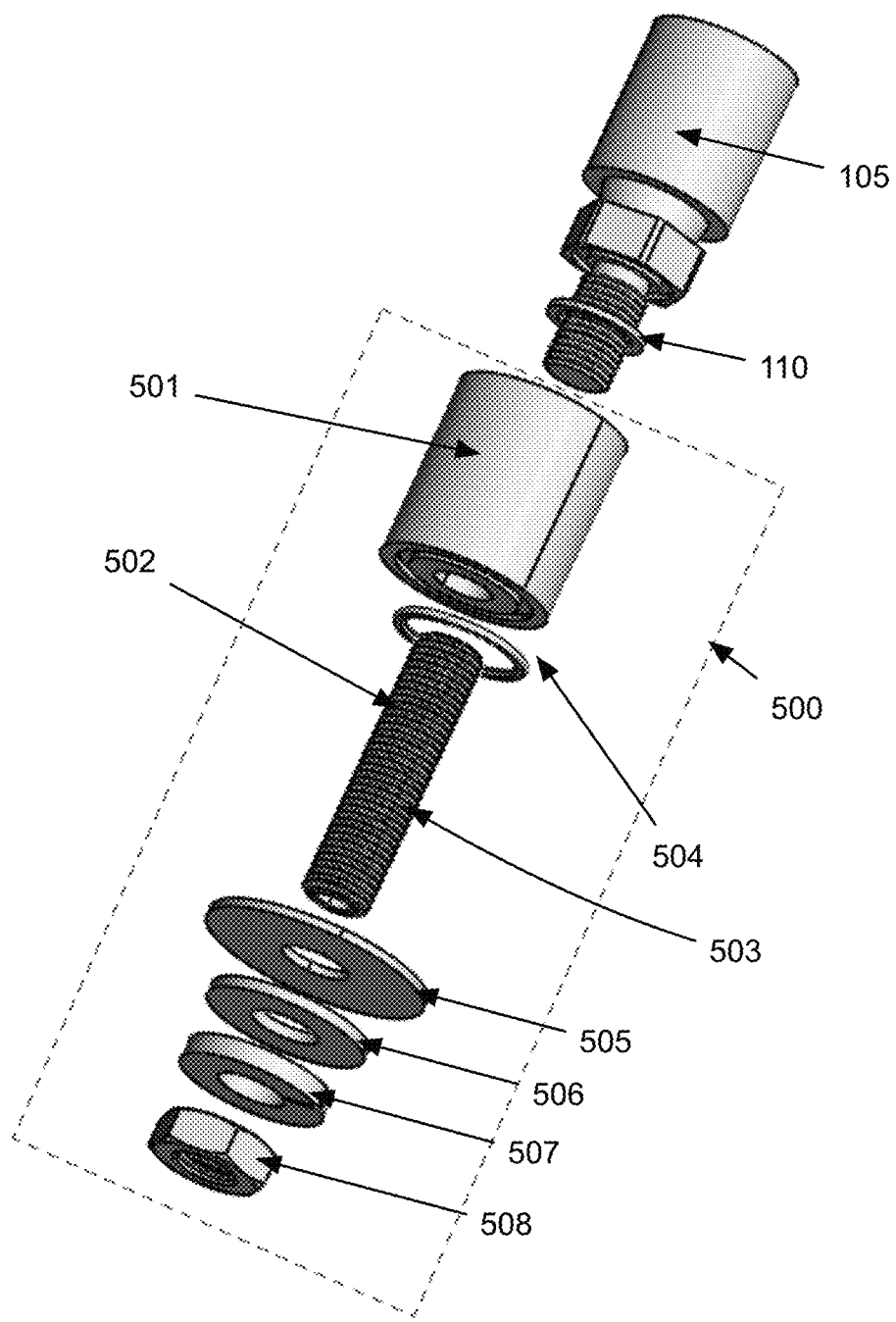
FIG. 9 is an exploded view of the thru-hull adapter of FIG. 8.

Referring now to FIGS. 8 and 9, a thru-hull adapter 500 designed for use with a pre-existing untapped drilled through hole 102 though a sphere or cylinder is shown. The pressure-proof housing, be it a sphere or cylinder 101, has a pre-existing spotface 104 and a untapped through hole 102. This adapter is particularly useful when the choice of connectors 105 require a larger thread diameter, or have a short thread length. The thru-hull adapter 500 creates a thread extender for an existing through hole 102. The thru-hull adapter is comprised of a first cylinder 501 that replaces the circular flat of previous embodiments, and, a hollow threaded shaft 502. The first cylinder 501 includes at least two internal threads 509, 510. A first internal thread 509 of the cylinder 501 is sized to match the external threads 112 on the connector 105. A second internal thread 510 of the first cylinder 501 is sized to match the pre-existing untapped drilled through hole 102. Threaded connector post 502 threads into the base of the cylinder 501, and is long enough to pass through the pressure proof housing wall with enough length for the fastener stack. In a preferred embodiment, the top face 511 of the cylinder 501 is machined to a 32 RMS-circular finish providing a good sealing surface for the chosen connector's o-ring 110. O-ring 504 seals the first cylinder 501 to the spotface 104, and is restrained from moving by the fastener stack comprised of a plastic flat washer 505, steel flat washer 506 of a diameter slightly smaller than the plastic flat washer 505, a lock washer 507, and a thin jam hex nut 508. Means to prevent rotation, such as wrench flats or holes to accommodate a spanner wrench, or other means, may be employed.

Care in handling will be required as the overall height of this solution can create new problems as side loading from impacts, stray lines, or shipboard technicians reaching for a handle may over-torque the connector. In one embodiment (not shown) a protective cage is bonded to the exterior of the sphere or cylinder to minimize the likelihood of unintended damage.

Figure 10:
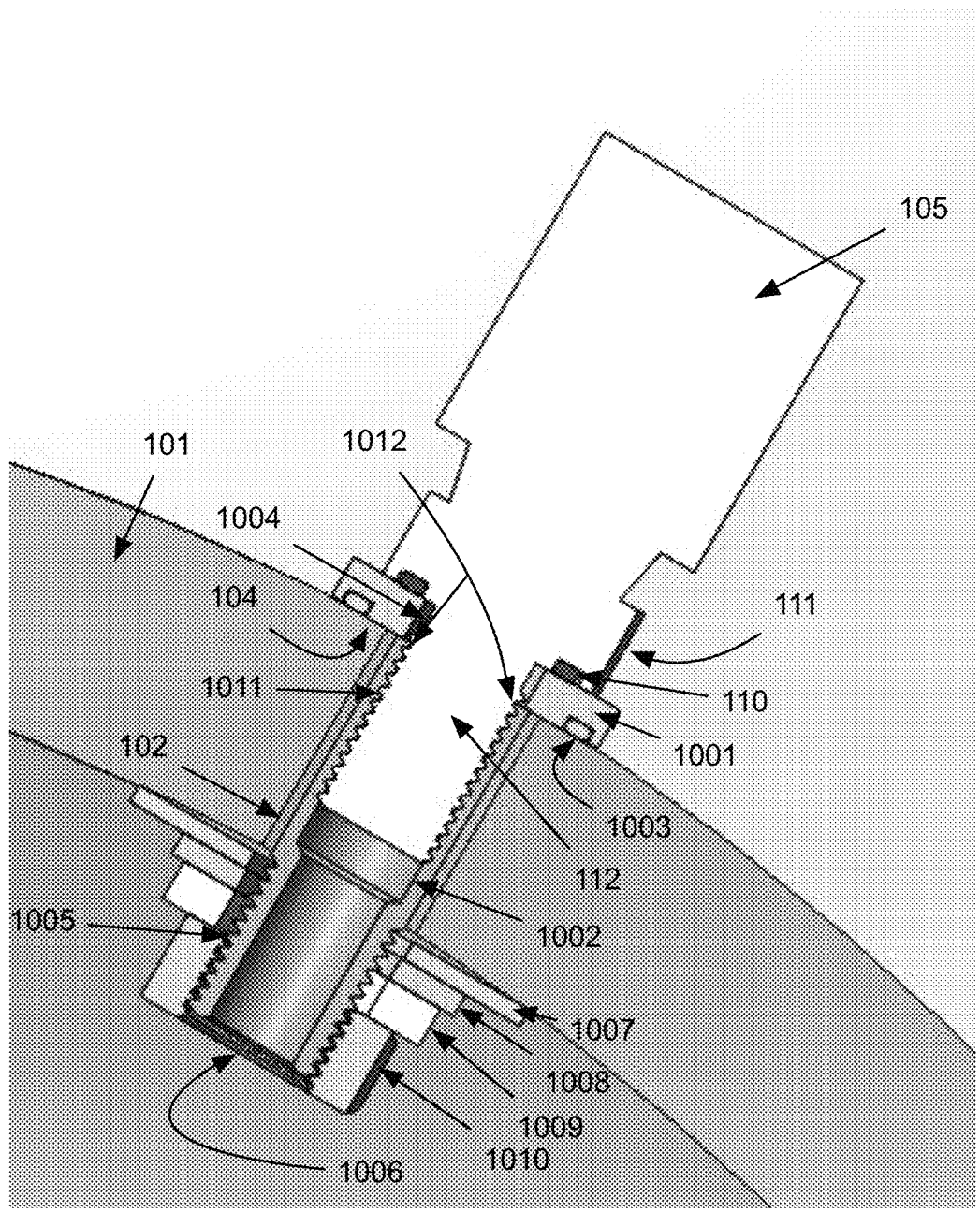
FIG. 10 is a section view of the thru-hull adapter with an o-ring seal, made as two-parts.
Figure 11:
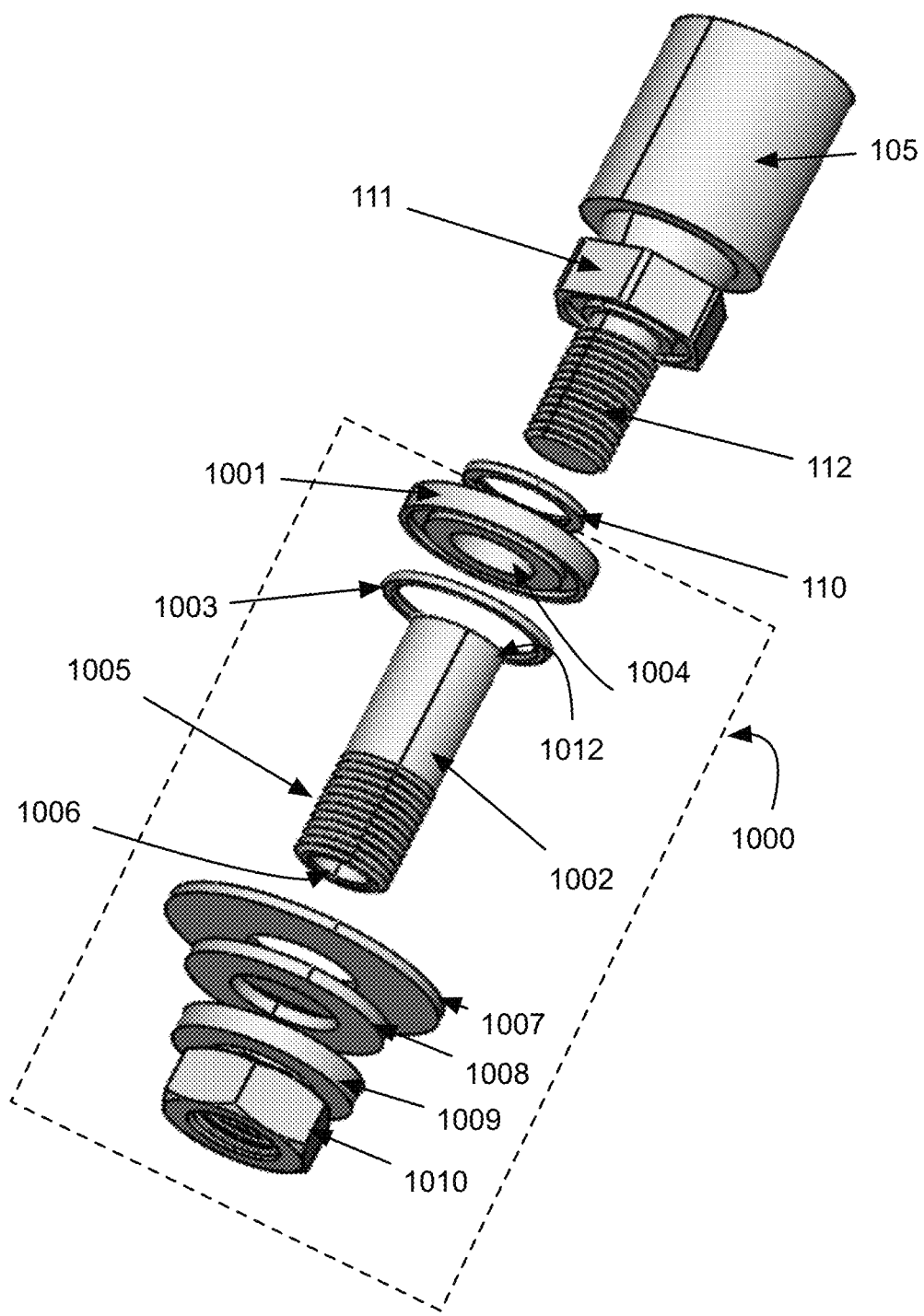
FIG. 11 is an exploded view of the thru-hull adapter of FIG. 10.

Turning now to FIGS. 10 and 11, an alternate embodiment of the assembly of FIGS. 2 and 3, described earlier, is shown. Here the thru-hull adapter 1000 is made in two parts, a circular interface plate 1001, and a hollow threaded shaft 1002, rather than a single part. A connector 105 having a threaded shaft 112 passes through a clearance hole 1004 in the interface plate 1001, engaging an internal thread 1011 of the hollow threaded shaft 1002. Screwing the connector threaded shaft 112 into the internal threads 1011 of the hollow threaded shaft 1002 clamps the circular interface plate 1001 between the connector 105 and the top surface 1012 of the circular interface plate 1001, thereby forming a watertight seal with o-ring 110. During assembly, two thin jam nuts, not shown, are threaded onto the external thread 1005 of the hollow threaded shaft 1002 and, tightened together, act as a fixed hexhead providing a means to tighten the hollow threaded shaft 1002 against the interface plate 1001 and connector body 105. Once the assembly is tightened, the jam nuts are loosened and removed. Wires for electrical connection between the connector 105 and the interior of the pressure-proof housing pass through the hollow threaded shaft 1002 and exit the clearance hole 1006.

The curved outer surface of the pressure-proof housing 101 has a flat 104 ground into the surface slightly larger in diameter than the sealing o-ring 1003. An untapped clearance hole 102 is bored through the housing perpendicular to and centered on the ground flat 104. The circular interface plate 1001 is sealed to the spotface 104 by o-ring 1003, and restrained tightly by the fastener stack comprised of a plastic flat washer 1007, steel flat washer 1008 of an outside diameter slightly smaller than the plastic flat washer 1007, a lock washer 1009, and a single thin jam hex nut 1010. Flats 111 are provided on the connector body 105 to hold the body from turning while the fastener stack is assembled and tightened from inside the sphere or cylinder.

Benefits of this design embodiment include:
1) Only the interface plate 1001 need be made of the same material as the connector body 105, significantly reducing, if not eliminating, potential damage due to galvanic corrosion. It is a simple part to manufacture, and inventory may be kept without heavy commitment of capital, improving delivery of the part. Most common connector body 105 materials include: 1) passivated 316 Stainless Steel, 2) Titanium (CP or 6-4), and 3) Brass (UNS-C36000). Other metals may be substituted, including alloys of aluminum such as 6061-T6 and 7075-T6, Naval Bronze, NiAl-Bronze, and others. Non-metallic connectors made of epoxy, such as Fiberite, or engineering plastics, such as PEEK, may likewise be used with these adapters.

In one embodiment, for custom underwater connectors made with long threaded shafts 112 that have sufficient length to extend to the interior of the pressure proof housing, the hollow threaded shaft is not needed and the washer stack 1007-1010 attach directly to the shaft 112 of the connector 105. The circular interface plate 1001 is all that is needed to provide a sealing surface and support to a ground and polished spotface on a sphere or cylinder surface as shown previously by the inventor. With a larger o-ring than the connector, the interface plate distributes the load over a wider surface, similar in some respects to a snowshoe, minimizing the occurrence of fracturing and spalling of a glass housing in the area of the through hole.

2) The interior threaded post 1002 may be made of an easy to machine material such as 303 Stainless Steel, free machining brass, or other material. Since it resides inside the sealing o-rings 1003 and 110, it does not come in contact with corrosive seawater, and is not subject to galvanic corrosion. Hence, only one body material for the interior threaded post 1002 may be stocked for all applications, and only the interface plate must be matched to the connector body material to prevent corrosion.

Figure 12:
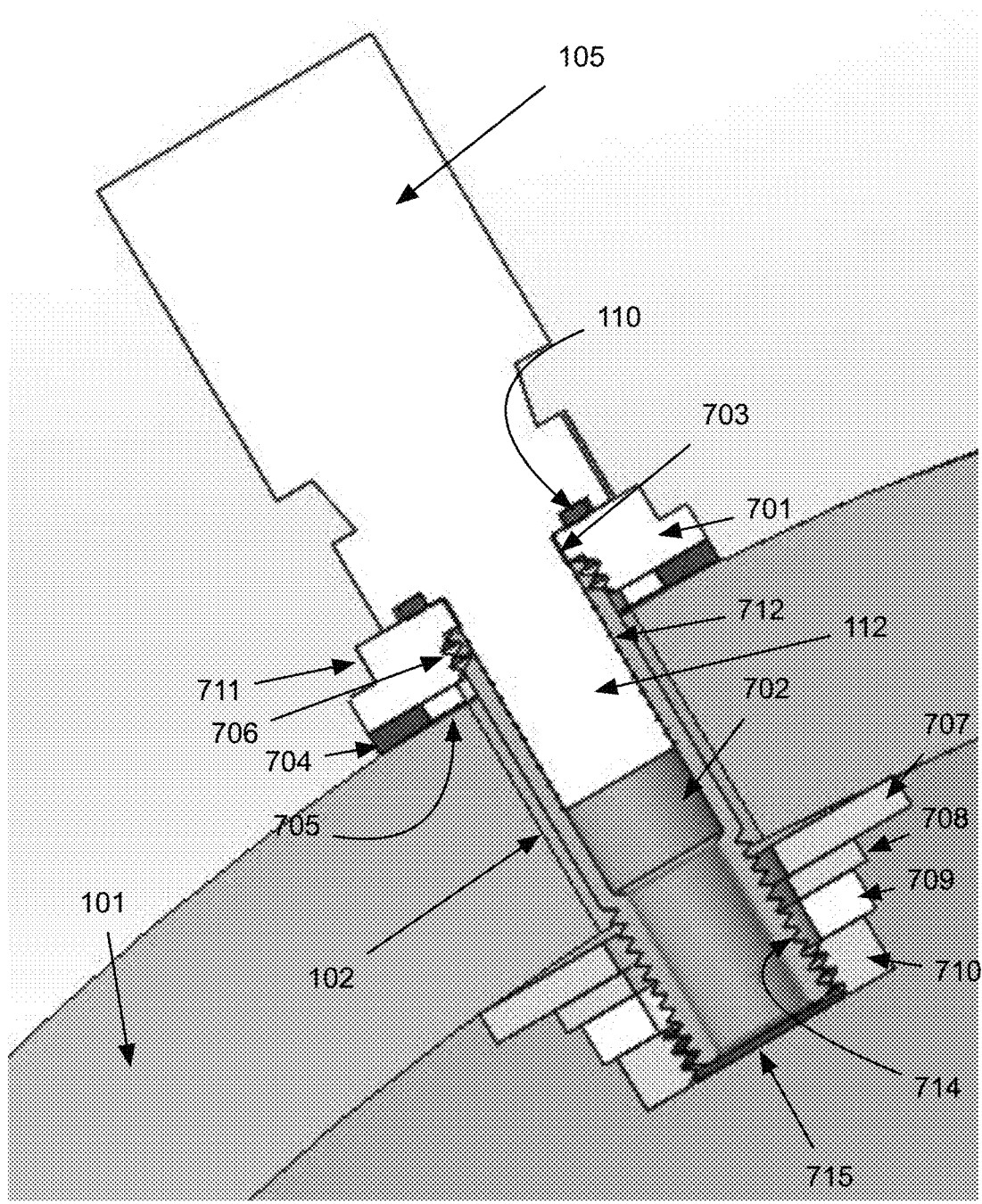
FIG. 12 is a section view of the thru-hull adapter with a bonded seal, made as two-parts.
Figure 13:
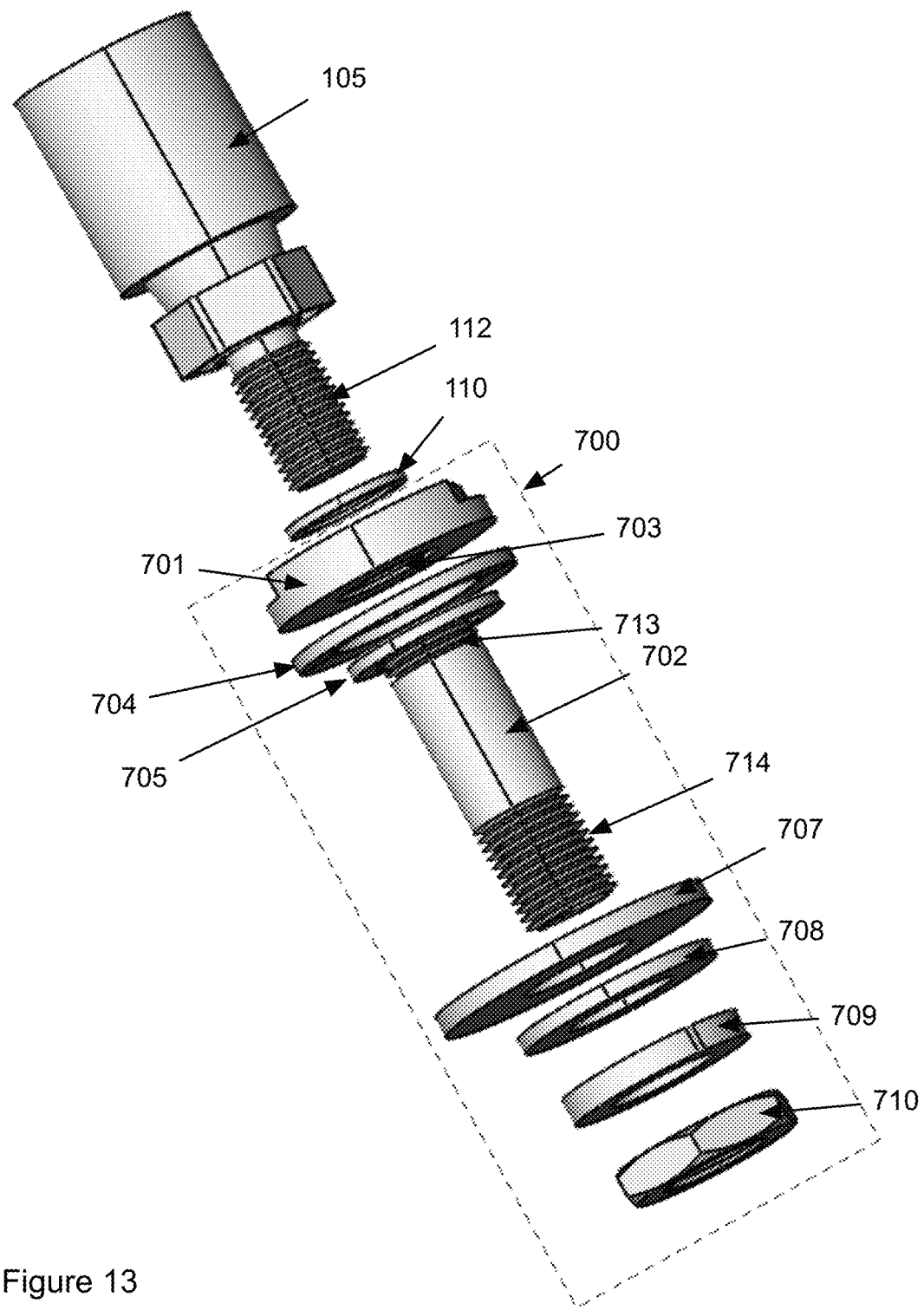
FIG. 13 is an exploded view of the thru-hull adapter of FIG. 12.

Referring now to FIGS. 12 and 13, we see a two-piece variation of FIGS. 4 and 5 above. The embodiment of the thru-hull adapter 700 shows a pressure-proof housing, be it a sphere or cylinder 101 drilled with through hole 102 on a radial line. The thru-hull adapter 700 is comprised of a flat circular plate 701, and a hollow threaded post 702. An internal thread 706 of the flat circular plate 701 engages with an extenal thread 713 on the upper end of the threaded post 702 to sufficiently to hold the assembly together during installation. Thread locker may be used during assembly to secure the parts. In-line axially with the internal thread 706 is a clearance hole 703 of appropriate size to allow the threaded shaft 112 of the connector 105 to pass through circular plate 701 and engage the interior thread 712 of threaded post 702. The thread size and depth of the internal thread 712 is chosen to match the preferred connector 105. Tightening the connector 105 provides additional force to hold the interface plate 701 and threaded post 702 together, while compressing o-ring 110 to make a water tight seal. As described above, the circular interface plate 701 is prevented from point loading the housing at the edge of the drilled hole by a plastic spacer 705, in one embodiment made from an engineering plastic such as PEEK or Acetal, or other suitable plastic. A marine grade elastomer 704 is applied to the glass surface, the underside of the circular interface plate 701, and coating the plastic flat spacer 705. In one embodiment the elastomer 704 is 3M 5200, or other appropriate marine-grade or waterproof construction adhesive. Preparation and cleaning of the surfaces to be bonded must be done carefully and thoroughly. A one or two-part primer for the metal may be required.

The thru-hull adapter fitting assembly 700 is drawn down to engage the plastic spacer 705 by the interior fastener stack comprised of a plastic flat washer 707, steel flat washer 708 of a diameter slightly smaller than the plastic flat washer 707, a lock washer 709, and a thin jam hex nut 710. The thin jam hex nut 710 engages the lower thread 714 on the threaded post 702. Wrench flats 711 are provided on the circular interface plate 701 to hold the assembly from turning while the interior fastener stack is assembled and tightened. Other means to prevent rotation, such as holes to accommodate a spanner wrench, or other means, may be employed. Excess elastomer 704 will squeeze out of the interface as the fastener stack is tightened, assuring a full fill by purging any entrained air and filling any voids. Clean-up of excess elastomer is made according to manufacturer directions. The connector is sealed to the thru-hull adapter 700 by compressing sealing o-ring 110. The thru-hull adapter body 700 may be scaled to fit any size thread of the preferred connector. The top surface of the circular plate 701 is machined to a 32 RMS-circular finish providing a good sealing surface for the chosen connector's o-ring 110. As described above, the plate 701 is made of material to match the body of the preferred connector to eliminate galvanic corrosion. Wires from connector 105 pass through the center clearance hole 715 in threaded part 702.

Figure 14:
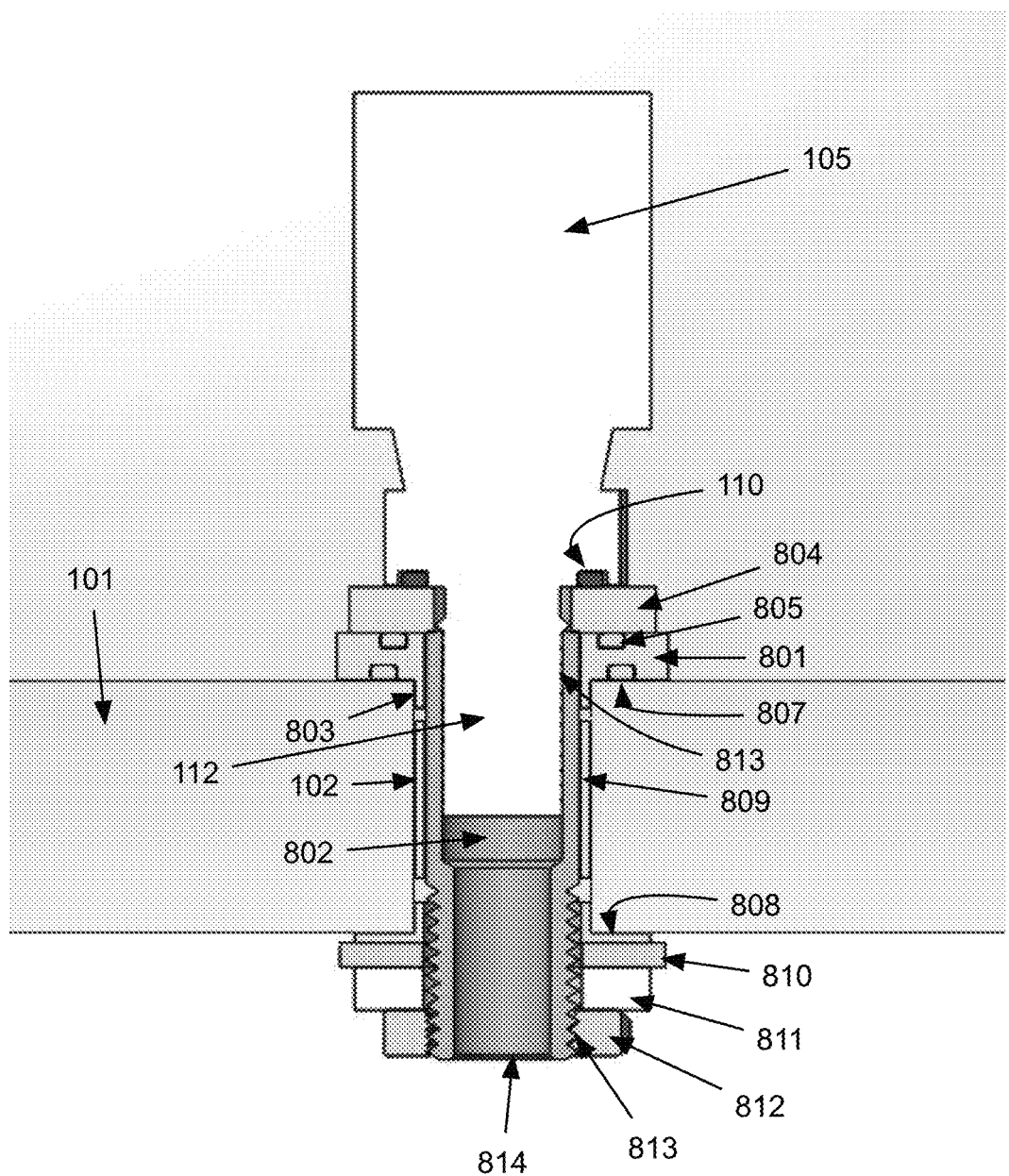
FIG. 14 is a section view of the thru-hull adapter, with an o-ring seal, made as two-parts, to electrically isolate a connector from an endcap.
Figure 15:
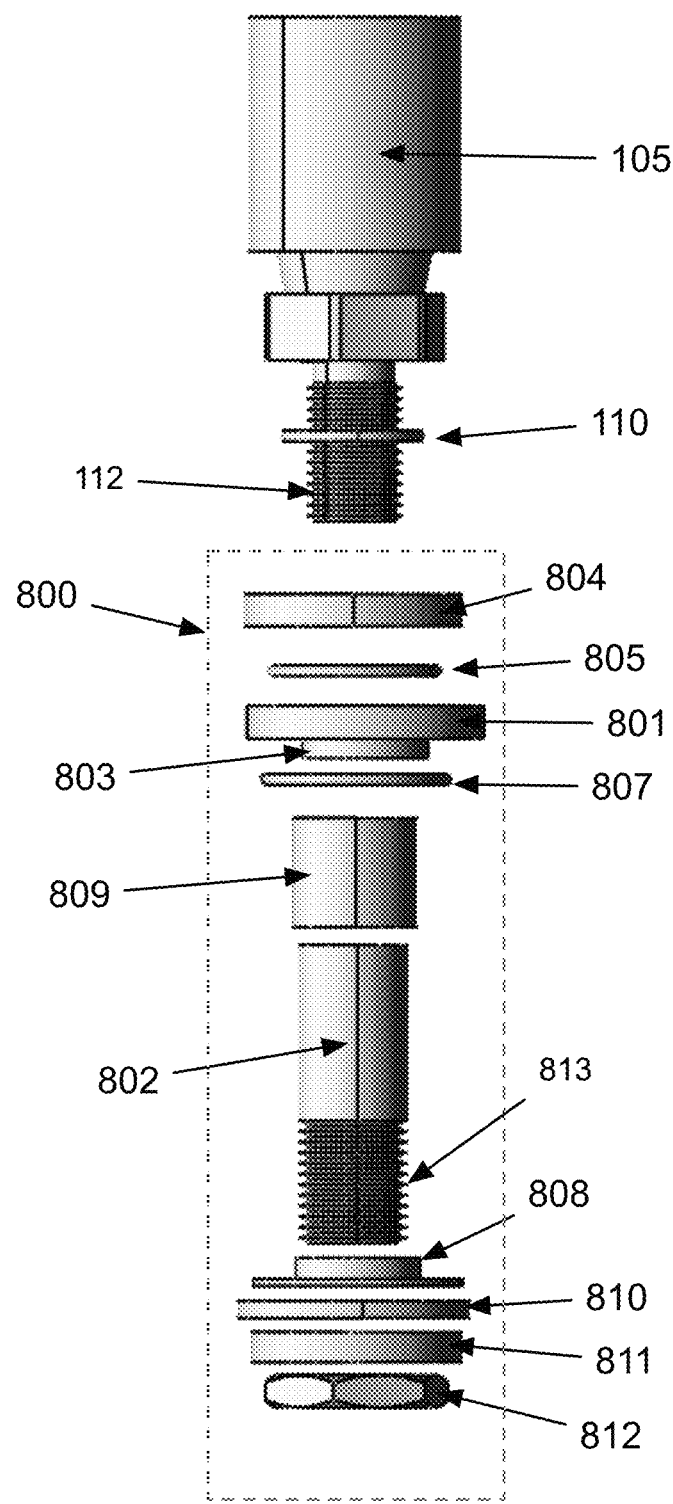
FIG. 15 is an exploded view of the thru-hull adapter of FIG. 14.

Referring now to FIGS. 14 and 15, we see an adaptation of the thru-hull adapter of FIGS. 10 and 11 for a flat surface of a pressure-proof housing. Connector 105 seals with o-ring 110 against a flat interface plate 804. In a preferred embodiment, the flat interface plate is machined from the same material as the body of connector 105. A hollow threaded post 802 having internal threads 813 is assembled onto the threaded shaft 112 of the connector 105, capturing the flat interface plate 804 and a non-metallic flanged sealing washer 801 between itself and the connector body 105, compressing o-rings 805 and 807. Both the top surface and the bottom surface of the flat interface plate 804 are finished for an o-ring surface finish, in a preferred embodiment of 32 RMS-circular finish. The non-metallic flanged sealing washer 801 is machined of some non-metallic engineering plastic such as PEEK or Acetal, or alternately made of non-porous ceramic, or other non-conductive material. The non-metallic flanged sealing washer 801 seals against the interface plate 804 with o-ring 805 on the top, and seals against the exterior surface of the pressure-proof vessel 101 with o-ring 807. A flange 803 on the non-metallic flanged sealing washer 801 extends into a hole 102 drilled through the wall of the pressure proof housing 101, centering the connector in the through hole, preventing the connector from mechanically engaging the bore of the hole 102 and electrically isolating the two. On the interior side of the pressure proof housing, a plastic flanged washer 808, centers the threaded post 802 in the through hole 102, electrically isolating the two. The arrangement is drawn down by tightening jam nut 812 on external thread 813 on hollow threaded post 802, thereby compressing o-ring 807 against the outer surface of the pressure proof housing 101. The interior fastener stack consists of a metal washer 810, lock washer 811, and jam nut 812. In another embodiment, if the wall of the pressure proof housing is of sufficient thickness, a center insulating sleeve 809 is added. Wires from connector 105 pass through the center clearance hole 814 in threaded part 802.

Figure 16:
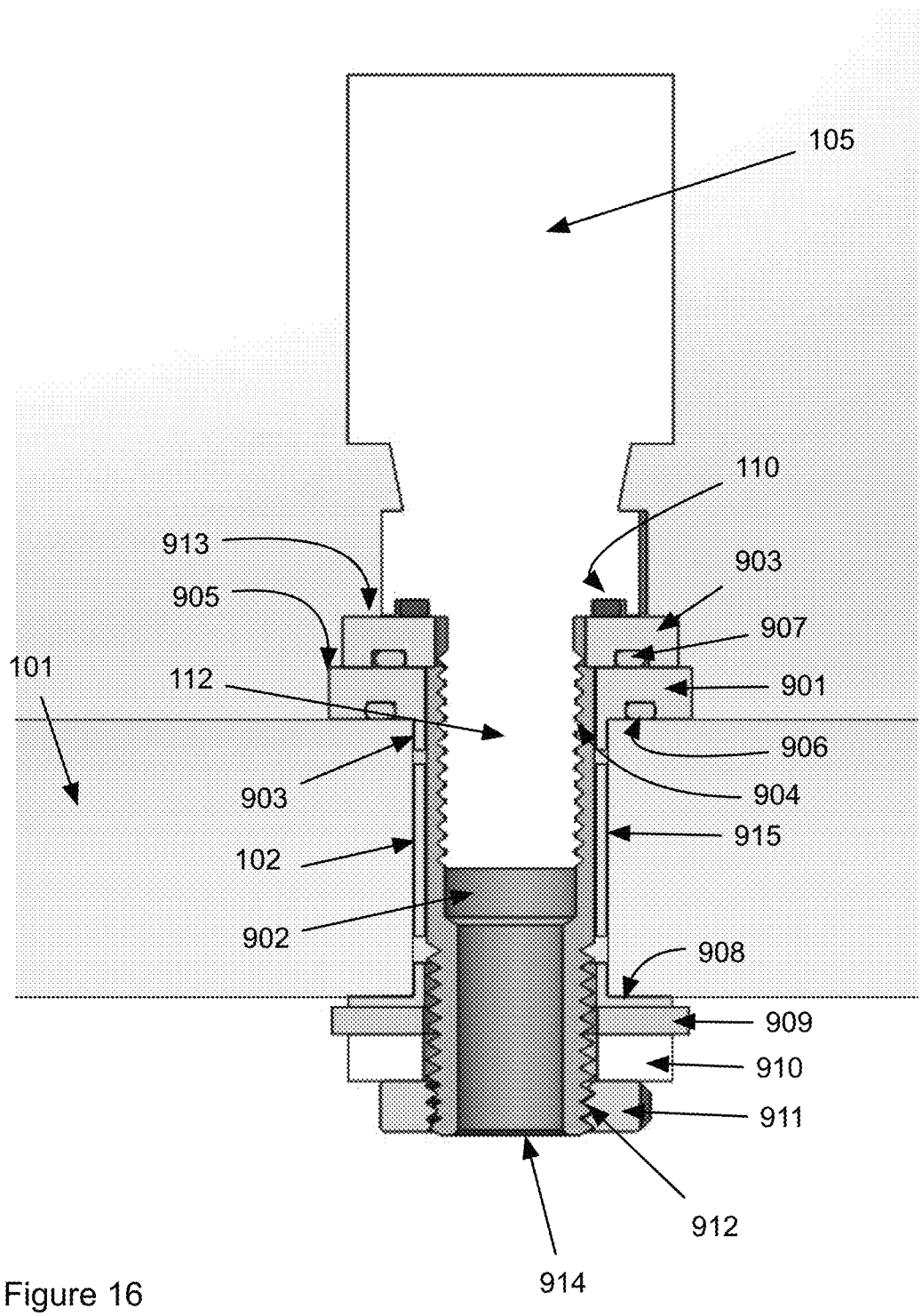
FIG. 16 is a section view of the thru-hull adapter, with an o-ring seal, made as two-parts, as an alternate embodiment to electrically isolate a connector from an endcap.
Figure 17:
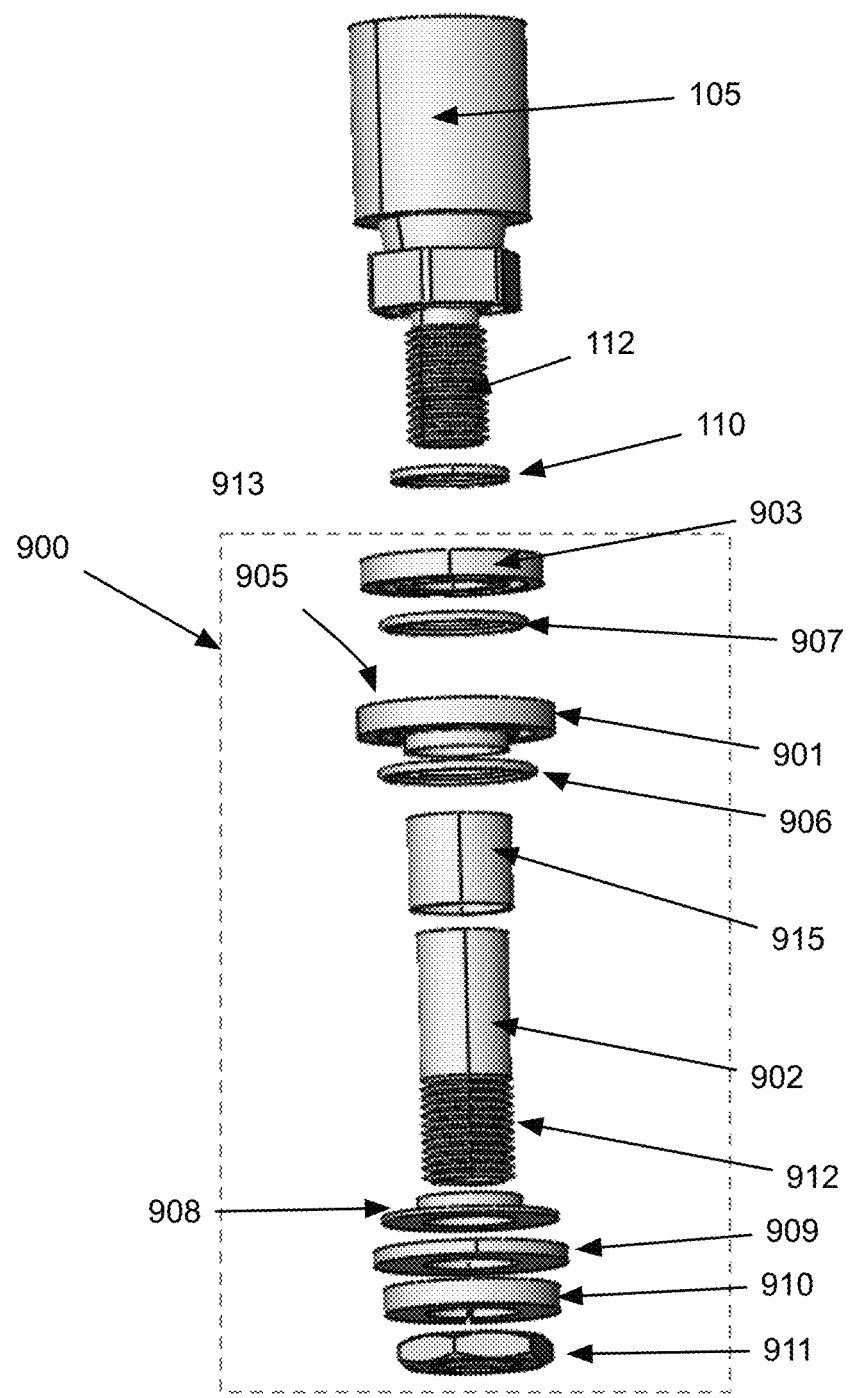
FIG. 17 is an exploded view of the thru-hull adapter of FIG. 16.

Turning now to FIGS. 16 and 17, we see an alternate embodiment of the previous thru-hull connector 800. The connector 105 having a threaded shaft 112 and o-ring 110 is assembled by inserting the threaded shaft 112 through the interface plate 903 and non-metallic circular insulator body 901 and screwed into internal threads 904 on the hollow threaded post 902 as shown. O-ring 907 seats against the top surface 905 of non-metallic circular insulator body 901. In the preferred embodiment the top surface 905 of the non-metallic circular insulator body 901 and the top surface 913 of the interface plate 903 are machined to a 32RMS-circular finish. A sealing o-ring 906 on the bottom of the non-metallic circular insulator body 901 seals against the top surface of the flat end cap of a pressure proof housing 101 (shown), or domed endcap (not shown). A flange 903 extends from the lower side of insulator body 901, centering the connector in the through hole 102. On the interior of the pressure proof housing 101, a plastic flanged washer 908, centers the threaded post 902 in the through hole 102. The arrangement is drawn down, compressing o-ring 906 against the wall of the pressure proof housing, by metal washer 909, lock washer 910, and jam nut 911, which engages external thread 912 on the lower end of hollow threaded post 902. In one embodiment, If the wall of the pressure proof housing 101 is of sufficient thickness such that there is a gap between the flanged washers 908 and the circular body 901, a center insulating sleeve 915 maybe added. Wires from connector 105 pass through the center clearance hole 914 in threaded part 902.

Figure 18:
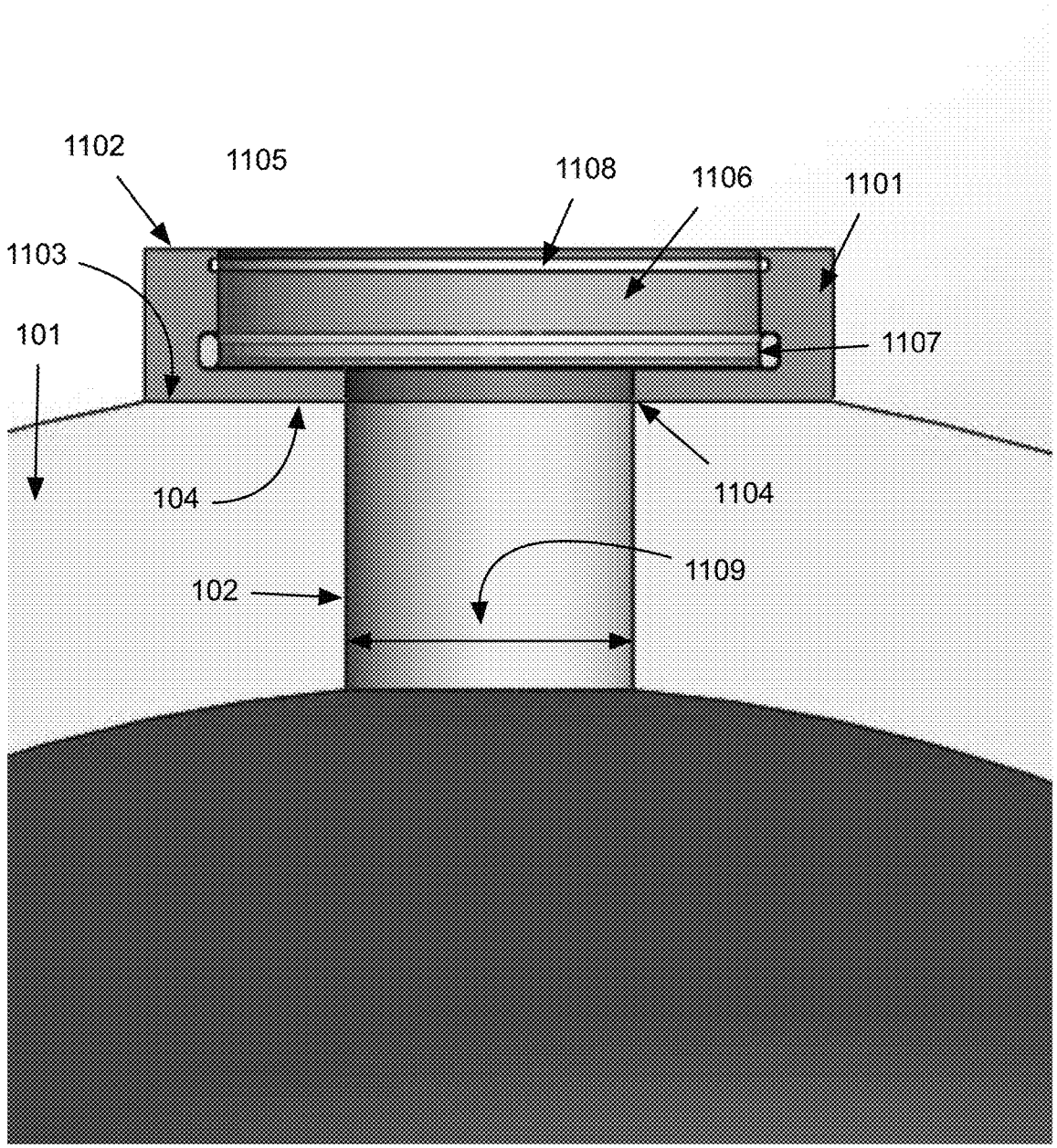
FIG. 18 is a section view of the thru-hull adapter with a camera viewport made of plastic body, fused to a spherical plastic housing.
Figure 19:
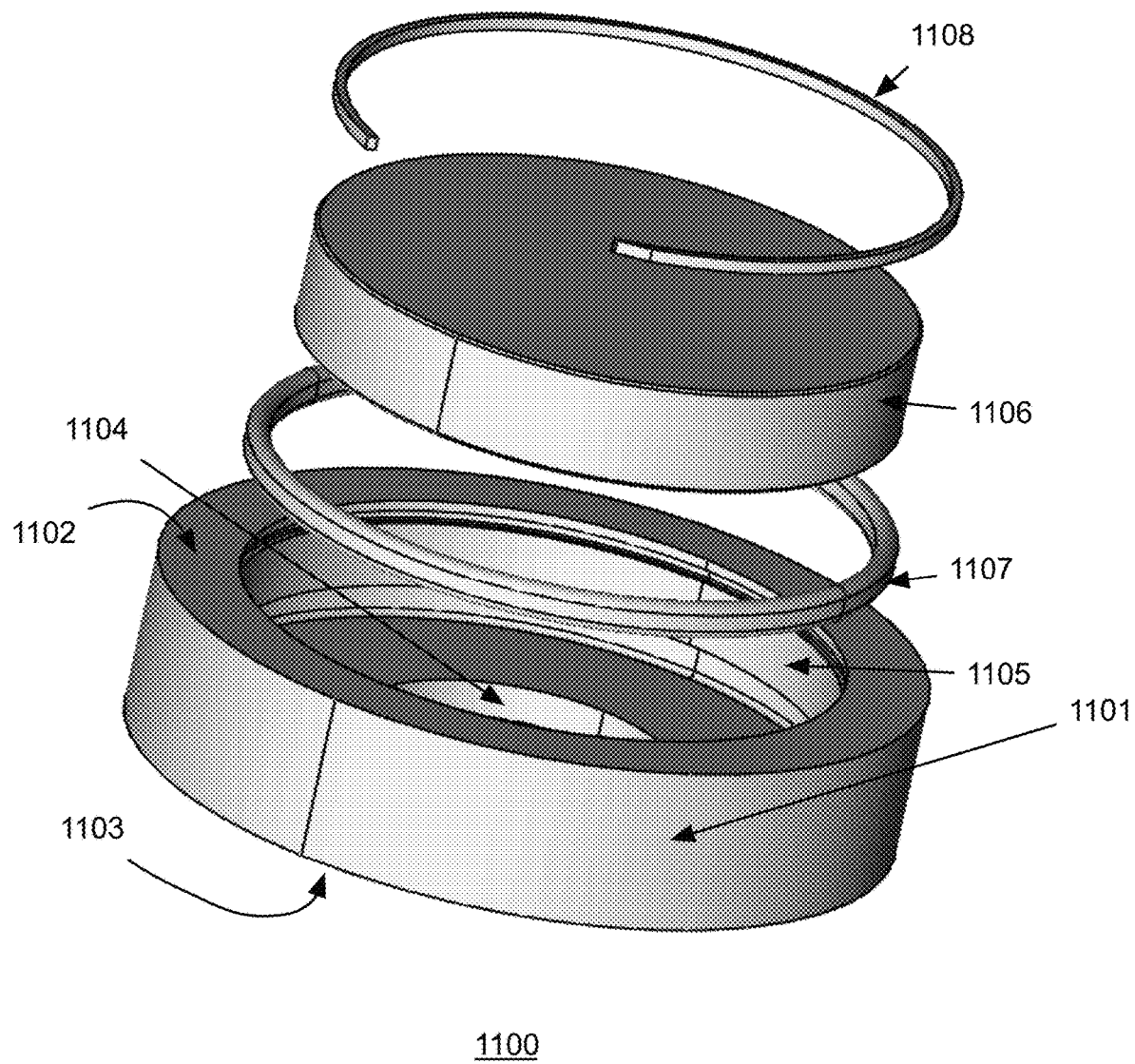
FIG. 19 is an exploded view of the thru-hull adapter of FIG. 18.

Turning now to FIGS. 18 and 19, a special variation of a camera view port 1100 is shown. A pressure proof housing 101 that in a preferred embodiment is made of plastic such as injection molded polystyrene or other suitably strong, zero porosity plastic, is joined to a machined viewport holder 1101 of preferably the same material as the pressure proof housing 101, and attached by means of solvent bonding, thermal fusion, adhesive bond, or other means commonly practiced. The proof housing 101 is machined to have a through hole 102 on a radial line, and a spot face 104 centered at and perpendicular to the through hole 102. The through hole 102 has a diameter 1009 that matches a similar through hole 1104 in the viewport holder 1101, that are used for alignment during the assembly bonding process. An alignment and compression fixture (not shown) centers the viewport frame on the pressure proof housing 101 during the bonding or fusion process, providing precise alignment and satisfactory engagement. The viewport holder 1101 is a short cylinder having a top surface 1102, a bottom surface 1103, and an internal counterbore 1105 designed to hold a clear viewport 1106 made of clear plastic, such as acrylic or polycarbonate, synthetic sapphire, or any other clear material including glass. In the optimal embodiment, the dimensions of the viewport holder 1101 are sufficient to hold dimensional tolerances during the bonding or fusion process, and no additional post-bonding machining will be required. An o-ring 1107 recessed into a groove machined into the viewport holder counterbore side wall, makes a watertight seal between the outside diameter of the viewport 1106 and the interior of the viewport holder. A face seal o-ring may alternately or jointly be employed that seals the bottom face of the viewport 1106 to the interior bottom surface of the internal counterbore 1105. The viewport is retained by a snap ring 1108 or other means.

Figure 20:
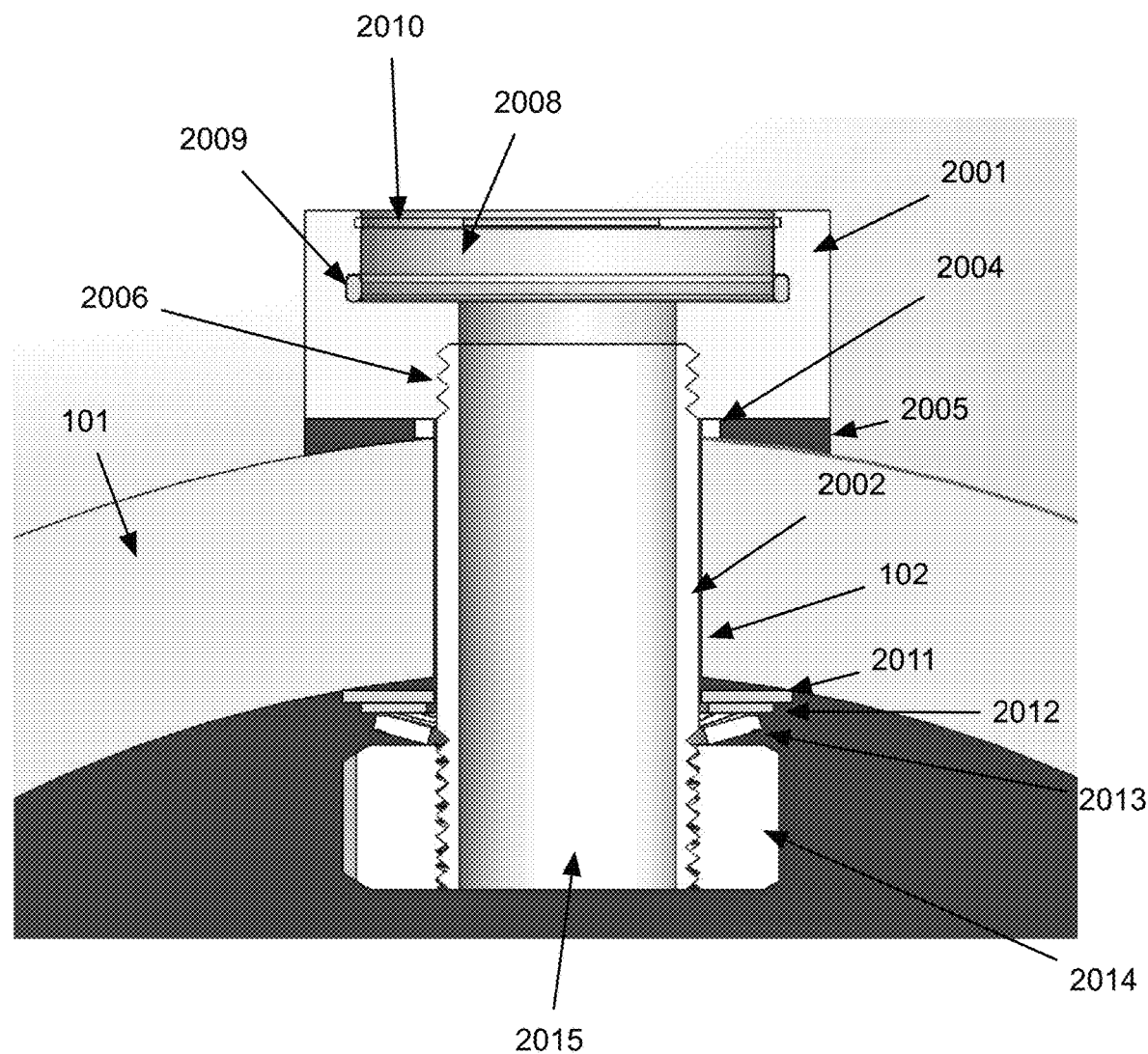
FIG. 20 is a section view of the thru-hull adapter with a camera viewport with a bonded seal.
Figure 21:
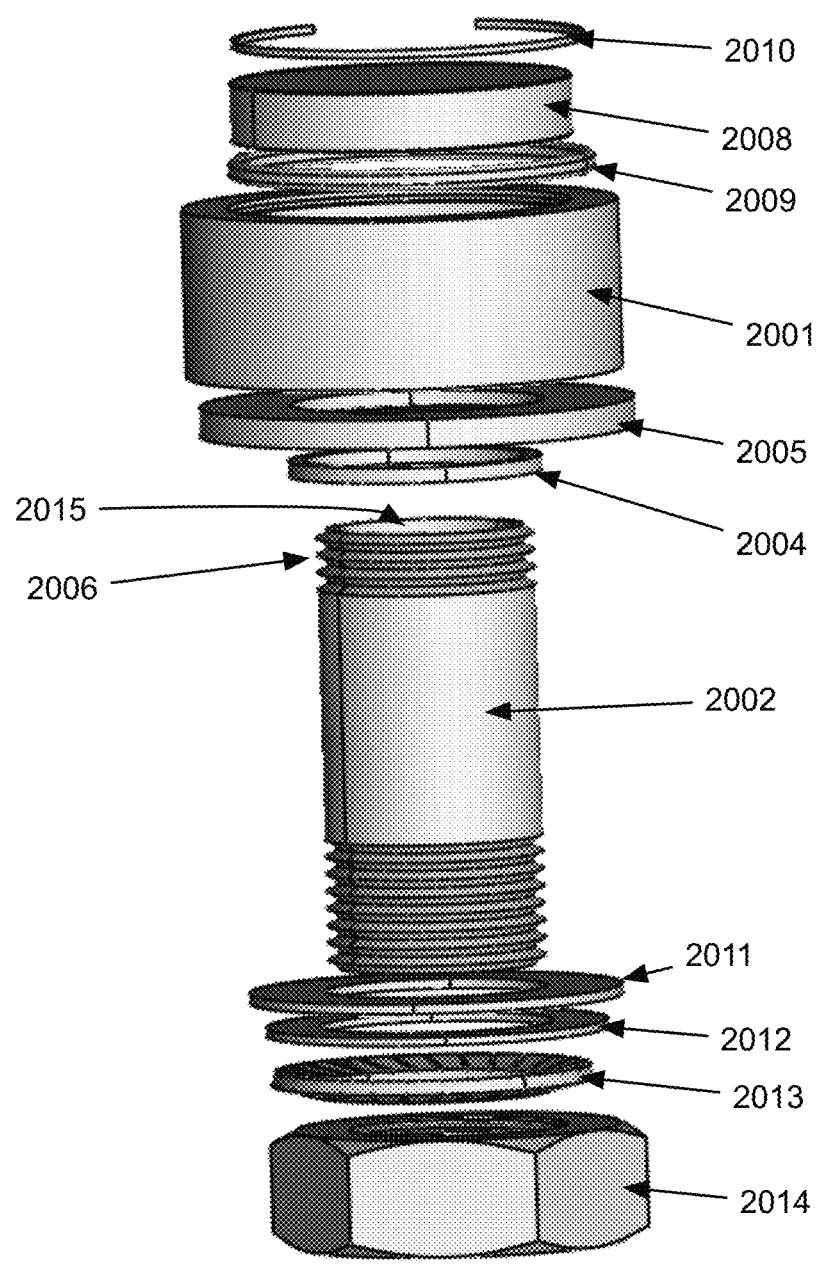
FIG. 21 is an exploded view of the thru-hull adapter of FIG. 20.

Looking now to FIGS. 20 and 21, we see another embodiment of a thru-hull adapter 2000 adapted as a viewport for a spherical pressure proof housing 101, which provides a means to place a camera on the interior of a sphere without regard for clarity of the housing, and avoiding the expense, time, and loss of strength of polishing a sphere made of glass. The pressure proof housing 101 has a radial through hole 102. Viewport holder 2001 is secured to a hollow threaded post 2002 by threads 2006 located on the top outer surface of the hollow threaded post 2002. The center hole 2015 of the hollow threaded post 2002 is selected to fit a desired camera module. The viewport holder 2001 is prevented from point loading the edge of a drilled hole by a thin plastic spacer 2004, especially important with glass housings. In a preferred embodiment the plastic spacer 2004 is made from engineering plastic such as PEEK, Acetal, or other appropriate plastic. A marine grade elastomer 2005 is applied to the outer surface of the pressure proof housing 101, the underside of the viewport holder 2001, and the circular flat spacer 2004. Elastomer 2005 is 3M 5200, or other waterproof construction adhesive. Preparation and cleaning of the surfaces to be bonded must be done carefully and thoroughly. A one or two-part primer for the metal may be required.

Viewport 2008 is made of sapphire, glass, acrylic, polycarbonate, or any other appropriate clear material. O-ring 2009 seals the gap between the outer diameter of the viewport 2008 and the inner wall of the viewport frame 2001, designed to accepted o-ring standards. A face seal o-ring may alternately or jointly be employed. A retaining ring 2010 holds the viewport 2008 in place.

An interior stack of fasteners draws the assembly down against the surface of the pressure proof housing 101, and is comprised of a plastic flat washer 2011, steel flat washer 2012 of a diameter slightly smaller than the plastic flat washer 2011, a lock washer 2013, and a thin jam hex nut 2014. Means maybe provided to hold the Viewport holder 2001 from turning, such as wrench flats or holes to accommodate a spanner wrench, while the fastener stack is assembled and tightened.

SUMMARY

Multiple embodiments of thru-hull adapters for underwater pressure-proof housings are described. The adapters are suitable for use with pressure proof housings including spheres, cylinders, flat and domed end caps. The thru-hull adapter is comprised of a pressure-proof circular disk that is sized to fit over a through hole drilled through the outer wall of a pressure-proof housing, a hollow threaded rod that attaches to the circular disk and extends into the interior of the pressure proof housing, a fastener stack including washers and a jam nut that when tightened pulls the circular disk against the outer wall of the pressure proof housing and, with either a bonded or o-ring elastomeric seal, forms an air and water tight seal between the thru-hull adapter and the wall of the pressure proof housing. The hollow threaded rod further includes threads on its interior that are sized to mate with a threaded shaft on connectors used with pressure-proof housings in deep sea exploration. The present invention provides for multiple unique and practical means to utilize holes of varying sizes drilled or machined in spheres, flat end caps, and domes for the passage of data, power, and fluid connection. The invention describes three means to seal the thru-hull adapters to the exterior of the hollow spheres, cylinders and flat or domed end caps: first, with an o-ring against a ground flat, the second using an elastomeric bond that adheres to both the housing and the thru-hull adapter fitting, and a third with a fusion technique of like materials.

What is claimed is:

1. A thru-hull adapter for connecting a connector (105) to a pressure proof housing (101), the connector including a threaded shaft (112) for connection to the thru-hull adapter, and, the pressure proof housing comprising a hollow sphere or cylinder, and, a hole (102) drilled through an outer wall (109) of the pressure proof housing, and, a circular flat (104) on an exterior surface of the pressure proof housing, the hole (102) drilled through a center of the circular flat and extending through the outer wall (109), the thru-hull adapter comprising:
   a) a flat circular interface plate (1001), having a top surface and a bottom surface, and, a hole through a center of the flat circular interface plate and extending through the top surface and the bottom surface, the hole sized to allow passage of the threaded shaft (112) of the connector, and, an o-ring (110) forming a seal between the top surface of the flat circular interface plate and the connector, and,
   b) a hollow threaded cylinder (1002) extending from the bottom surface of the flat circular interface plate, the hollow threaded cylinder including interior threads (1011) on an interior wall at a top of the hollow threaded cylinder, said interior threads sized to mate with the threaded shaft of the connector, and exterior threads (1005) on the hollow threaded cylinder near a bottom of the hollow threaded cylinder, and, the flat circular interface plate (1001) and the hollow threaded cylinder (1002) are made as two separate parts, and,
   c) a fastener stack comprising from a top to a bottom, a plastic washer (1007), a steel washer (1008), said steel washer having a diameter less than a diameter of the plastic washer, a lock washer (1009), and a jam nut (1010), the plastic washer, steel washer and lock washer each having a central hole sized such that the hollow threaded cylinder fits through each of the holes, and, the jam nut sized to screw onto the exterior threads on the hollow threaded cylinder, and,
   d) when the connector (105) is screwed into the interior threads (1011) of the hollow threaded cylinder, thereby forming a seal between the connector and the top surface of the flat circular interface plate, and, the hollow threaded cylinder is then passed through the hole in the outer wall of the pressure proof housing, and, the fastener stack is then assembled onto the bottom of the hollow threaded cylinder, and, the jam nut is screwed to tighten, and thereby seals the bottom surface of the flat circular interface plate to the outer wall of the pressure proof housing thereby forming an air and water tight seal between the connector on the exterior of the pressure proof housing and the interior of the pressure proof housing.

2. The thru-hull adapter of claim 1 wherein the flat circular interface plate further includes a circular groove located on the bottom and concentric with the hole, and, an o-ring (1003) located in the circular groove, and, when the jam nut is tightened, the o-ring located in the circular groove is compressed, thereby forming a seal between the bottom surface of the flat circular interface plate and the outer wall of the pressure proof housing.

3. The thru-hull adapter of claim 1 further including a plastic spacer placed (410) over the hollow threaded cylinder against the bottom surface of the circular flat, and, marine adhesive (411) placed to coat the bottom surface of the flat circular interface plate and the plastic spacer, and, when the jam nut is tightened the spacer centers the hollow threaded cylinder in the hole in the wall of the pressure proof housing and the adhesive forms a wedge shaped seal between the bottom surface of the circular flat and the outer wall of the pressure proof housing.

\* \* \* \* \*